(12) United States Patent
Cui et al.

(10) Patent No.: US 12,479,805 B2
(45) Date of Patent: Nov. 25, 2025

(54) INDAZOLE HYDRAZIDE COMPOUND AND APPLICATION THEREOF

(71) Applicant: Beijing Baheal Chengchuang Pharmaceutical Research and Development Co., Ltd., Beijing (CN)

(72) Inventors: Yimin Cui, Beijing (CN); Xiaocong Pang, Beijing (CN); Xu He, Beijing (CN); Yanlun Gu, Beijing (CN); Zhenming Liu, Beijing (CN); Song Song, Beijing (CN); Xia Zhao, Beijing (CN); Ying Zhou, Beijing (CN); Qian Xiang, Beijing (CN); Junling Zhang, Beijing (CN); Ran Xie, Beijing (CN); Xiaojiao Sun, Beijing (CN); Zhuo Zhang, Beijing (CN)

(73) Assignee: BEIJING BAHEAL CHENGCHUANG PHARMACEUTICAL RESEARCH AND DEVELOPMENT CO., LTD., Beijing (CN)

( * ) Notice: Subject to any disclaimer, the term of this patent is extended or adjusted under 35 U.S.C. 154(b) by 643 days.

(21) Appl. No.: 17/801,356

(22) PCT Filed: Nov. 26, 2021

(86) PCT No.: PCT/CN2021/133467
§ 371 (c)(1),
(2) Date: Aug. 22, 2022

(87) PCT Pub. No.: WO2022/170822
PCT Pub. Date: Aug. 18, 2022

(65) Prior Publication Data
US 2023/0097420 A1    Mar. 30, 2023

(30) Foreign Application Priority Data

Feb. 10, 2021    (CN) .......................... 202110183297.X
May 14, 2021    (CN) .......................... 202110527703.X

(51) Int. Cl.
*C07D 231/56*    (2006.01)
*A61P 35/00*    (2006.01)

(52) U.S. Cl.
CPC ............ *C07D 231/56* (2013.01); *A61P 35/00* (2018.01)

(58) Field of Classification Search
CPC .................................................. C07D 231/56
See application file for complete search history.

(56) References Cited

U.S. PATENT DOCUMENTS

2009/0233845 A1    9/2009    Ray et al.

FOREIGN PATENT DOCUMENTS

| CN | 101978266 A | 2/2011 |
|---|---|---|
| CN | 106565589 A | 4/2017 |
| CN | 112939868 A | 6/2021 |
| CN | 113101287 A | 7/2021 |
| CN | 113398121 A | 9/2021 |
| WO | WO 0222576 A2 | 3/2002 |
| WO | WO 2013076275 A1 | 5/2013 |
| WO | WO 2013162469 A1 | 10/2013 |

OTHER PUBLICATIONS

Schlager (Arch. Pharm. (1964), 297(6), 338-47 (abstract), Accession No. 1964:440394, retrieved from STN).*
Coumar, et al. (ChemMedChem (2010), 5(2), 255-267 (abstract), Accession No. 2010:139427, retrieved from STN).*
Registry No. 331418-89-4, STN Database.
Choi et al., "Suprafenacine, an Indazole-Hydrazide Agent, Targets Cancer Cells Through Microtubule Destabilization" *PLoS One*, 9(10):e110955, 2014.
International Search Report issued in International Application No. PCT/CN2021/133467, dated Aug. 18, 2022.
Qin et al., "Discovery of novel polo-like kinase 1 polo-box domain inhibitors to induce mitotic arrest in tumor cells," *J. Med. Chem.*, Just Accepted Manuscript, 1-27, 2016.
Registry No. 2492669-55-1, STN Database.
Registry Nos. 303205-73-4, 305354-30-7, and 305354-88-5, STN Database.
Savant et al., "Water Mediated Synthesis of N□-Arylmethylene-4,5,6,7-tetrahydro-2H-indazole-3-carbohydrazide Library" *Organic Chemistry International*, 1-4, 2014.
Wu et al., "Synthesis, Structure-Activity Relationship, andPharmacophore Modeling Studies of Pyrazole-3-Carbohydrazone Derivatives as Dipeptidyl Peptidase IV Inhibitors" *Chemical Biology & Drug Design*, 79(6):897-906, 2012.

* cited by examiner

*Primary Examiner* — Shawquia Jackson
(74) *Attorney, Agent, or Firm* — pH IP Law

(57) ABSTRACT

An indazole hydrazide compound, as represented in formula (I); wherein, R is selected from substituted alkyl, substituted alkenyl and substituted phenyl; substituent in the substituted alkyl and substituted alkenyl includes phenyl and/or substituted phenyl; R' is selected from H and alkyl. Compared with the prior art, the above indole hydrazide compound can be used as integrin avβ3 receptor antagonist. Besides, it has obvious anti-prostate cancer activity and has a significant inhibitory effect on enzalutamide-resistant cell lines. In addition, the above-mentioned compound has obvious anti-tumor angiogenesis activity and can be used in the preparation of anti-tumor angiogenesis drugs to inhibit tumor angiogenesis.

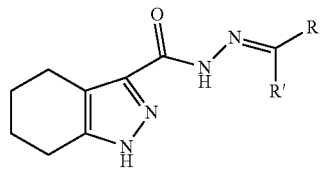

Formula (I)

4 Claims, 22 Drawing Sheets

| | | 10ul | 10ul | 10ul | 10ul | 10ul | 10ul | 10ul | 10ul | |
|---|---|---|---|---|---|---|---|---|---|---|
| | Solution | 1 | 2 | 3 | 4 | 5 | 6 | 7 | 8 | 9 | 10 |
| Cpd#19 | Preparation of 1000× DMSO stock solution volume | 30ul stock solution | 20ul DMSO | 20ul DMSO | 20ul DMSO | 20ul DMSO | 20ul DMSO | 20ul DMSO | 20ul DMSO | 20ul DMSO | 20ul DMSO | 2ul |
| | Preparation of 10× stock solution: medium volume + 1000× stock solution volume | | 198ul +2ul | 198ul +2ul | 198ul +2ul | 198ul +2ul | 198ul +2ul | 198ul +2ul | 198ul +2ul | 198ul +2ul | 198ul +2ul | |
| | Preparation of cell culture system (gel phase + aqueous phase) volume + 10× stock solution volume | | 90ul+ 10ul | 90ul+ 10ul | 90ul+ 10ul | 90ul+ 10ul | 90ul+ 10ul | 90ul+ 10ul | 90ul+ 10ul | 90ul+ 10ul | 90ul+ 10ul | 10ul |

FIG. 19

| Row | 1 | 2 | 3 | 4 | 5 | 6 | 7 | 8 | 9 | 10 | 11 | 12 |
|---|---|---|---|---|---|---|---|---|---|---|---|---|
| A | Null | Null | Null | Null | Null | Null | Null | Null | Null | Null | Null | Null |
| B | Null | Null | Null | Null | Null | Null | Null | Null | Null | Null | Null | Null |
| C | Null | DMSO | DMSO | DMSO | DMSO | BEZ235 | BEZ235 | BEZ235 | | | | Null |
| D | Null | Cpd#19 100 uM | Cpd#19 33.33uM | Cpd#19 11.13 uM | Cpd#19 3.70 uM | Cpd#19 1.23 uM | Cpd#19 0.41 uM | Cpd#19 0.14 uM | Cpd#19 0.05 uM | Cpd#19 0.02 uM | DMSO | Null |
| E | Null | Cpd#19 100 uM | Cpd#19 33.33uM | Cpd#19 11.13 uM | Cpd#19 3.70 uM | Cpd#19 1.23 uM | Cpd#19 0.41 uM | Cpd#19 0.14 uM | Cpd#19 0.05 uM | Cpd#19 0.02 uM | DMSO | Null |
| F | Null | DMSO | DMSO | DMSO | DMSO | BEZ235 | BEZ235 | BEZ235 | | | | Null |
| G | Null | Null | Null | Null | Null | Null | Null | Null | Null | Null | Null | Null |
| H | Null | Null | Null | Null | Null | Null | Null | Null | Null | Null | Null | Null |

FIG. 20

INDAZOLE HYDRAZIDE COMPOUND AND APPLICATION THEREOF

CROSS-REFERENCE TO RELATED APPLICATIONS

This application is a national phase application under 35 U.S.C. § 371 of International Application No. PCT/CN2021/133467, filed Nov. 26, 2021, the entire contents of which are hereby incorporated by reference; and which claims the priority of Chinese Patent Application No. 202110183297.X, filed with the China National Intellectual Property Administration on Feb. 10, 2021, and Chinese Patent Application No. 202110527703.X, filed with the China National Intellectual Property Administration on May 14, 2021, which are hereby incorporated by reference in entirety.

FIELD

The present disclosure relates to the field of drug synthesis, and particularly relates to an indazole hydrazide compound and an application thereof.

BACKGROUND

Prostate cancer is one of the most common malignant tumors in men in China and Western countries. With the gradual aging of population and changes in living habits, the incidence of prostate cancer is rising rapidly, and two-thirds of prostate cancer patients are already at an advanced stage when they are diagnosed, losing the opportunity for radical treatment. Endocrine therapy based on anti-androgen drugs is the preferred treatment for advanced prostate cancer, and satisfactory results can be obtained at the initial stage. However, after 12 to 18 months, most patients will gradually develop into a highly metastatic castration-resistant prostate cancer (CRPC), with 90% of metastatic CRPC occurring in the bones.

For CRPC patients who are resistant to the first-generation anti-androgen drugs, new anti-androgen drugs such as abiraterone and enzalutamide are clinically recommended. Although abiraterone and enzalutamide can prolong the survival of CRPC patients, clinical practice and large-scale clinical trials have shown that new anti-androgens are unable to avoid the emergence of primary or acquired resistance.

The interaction between extracellular matrix and tumor cells is the driving factor for the development of CRPC drug resistance. The interaction between tumor cells and extracellular matrix (ECM) promotes tumor cell proliferation, invasion and metastasis. Recent studies have demonstrated that ECM-mediated drug resistance is an important factor affecting tumor progression and treatment response. In bone metastatic CRPC, many integrin families, TGF-β family, bone resident protein, RANKL and PTHrP are involved in matrix remodeling and affect the drug resistance of prostate cancer. Therefore, the development of drugs that target the interaction between tumor cells and the microenvironmental matrix is expected to become a new therapeutic strategy to combat CRPC resistance.

Integrin receptor is an important extracellular matrix that affects tumor metastasis and drug resistance. Among them, αvβ3 receptors are expressed on tumor cells and host stromal cells, block the interaction between extracellular matrix and integrin receptor αvβ3, and can play an anti-tumor and metastasis effect. Cilengitide is an integrin receptor inhibitor against αvβ3, and has been tested on multiple phase II clinical trials in different types of tumors, including castration-resistant prostate cancer. Although cilengitide monotherapy was well tolerated, it exhibited a relatively weak anti-tumor activity, and ultimately the phase 3 clinical trial of cilengitide ended in failure.

In addition, tumor angiogenesis is closely related to tumor growth and metastasis, and anti-angiogenesis drugs have always been a hot spot in the development of tumor therapeutic drugs. VEGF family and its receptors play an important role in the process of tumor angiogenesis. Therefore, inhibiting the activity of VEGF family and its receptors and inhibiting the transmission of downstream signal molecules in turn can effectively inhibit tumor angiogenesis, However, it must be used in combination with chemotherapeutic drugs, and long-term administration may develop drug resistance.

SUMMARY

In view of this, the technical problem to be solved by the present disclosure is to provide an indazole hydrazide compound and an application thereof. The indazole hydrazide compound has a good inhibitory effect and affinity for the integrin αvβ3 receptor, and also has obvious anti-tumor angiogenesis activity.

The present disclosure provides an indazole hydrazide compound, as shown in formula (I):

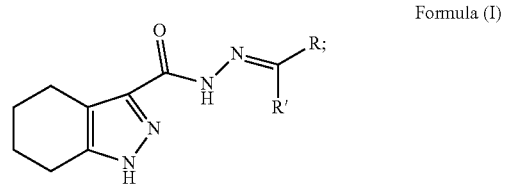

Formula (I)

wherein, R is selected from substituted alkyl, substituted alkenyl and substituted phenyl;

substituent in the substituted alkyl and substituted alkenyl includes phenyl and/or substituted phenyl;

R' is selected from H and alkyl.

Preferably, R is selected from substituted C2-C10 alkyl, substituted C2-C10 alkenyl and substituted phenyl;

R' is selected from H and C1-C10 alkyl.

Preferably, substituent in the substituted phenyl is selected from one or more of C1-C5 alkyl, C1-C5 alkenyl, hydroxyl, C1-C5 alkoxy, nitro and C1-C5 haloalkyl.

Preferably, the indazole hydrazide compound is one selected from formula (I-1) to formula (I-5):

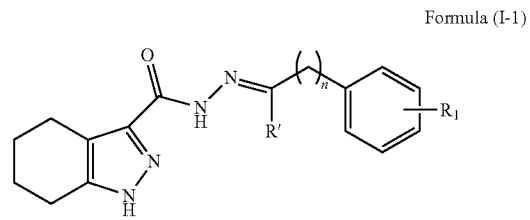

Formula (I-1)

Formula (I-2)

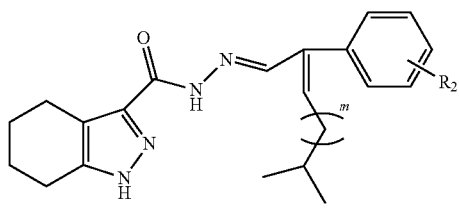

Formula (I-3)

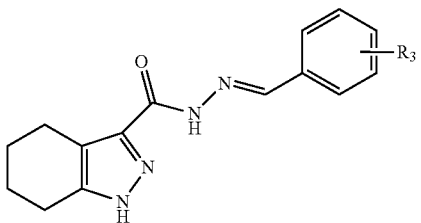

Formula (I-4)

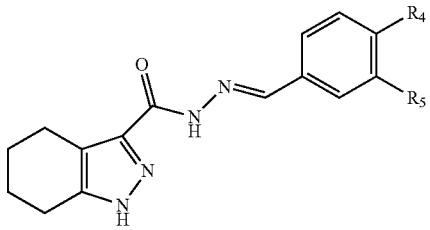

Formula (I-5)

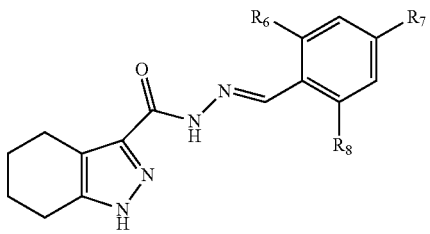

wherein, n and m are each independently an integer from 1 to 5;
R$_1$-R$_8$ are each independently selected from C1-C5 alkyl, C1-C5 alkenyl, hydroxyl, C1-C5 alkoxy, nitro and C1-C5 haloalkyl;
R' is selected from H and C1-C5 alkyl.

Preferably, n and m are each independently an integer from 1 to 3;
R$_1$-R$_8$ are each independently selected from C1-C3 alkyl, C1-C3 alkenyl, hydroxyl, C1-C3 alkoxy, nitro and C1-C3 haloalkyl;
R' is selected from H and C1-C3 alkyl.

Preferably, the indazole hydrazide compound is one selected from formula (1) to formula (12):

Formula (1)

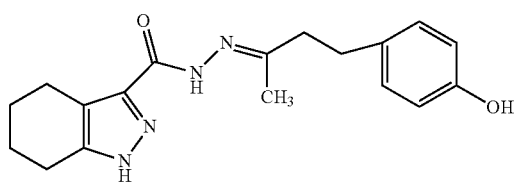 [SMILES: C/C(CCc1ccc(O)cc1)=N\NC(=O)c1n[nH]c2c1CCCC2]

Formula (2)

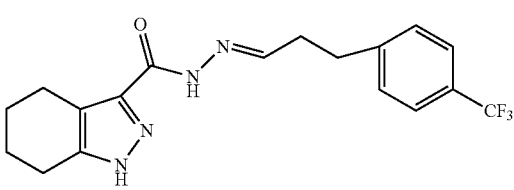

Formula (3)

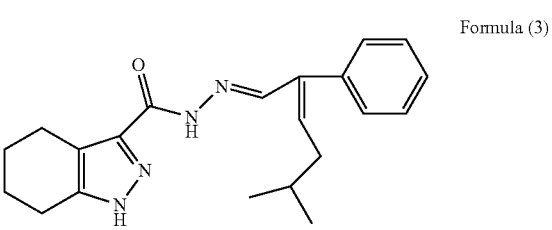

Formula (4)

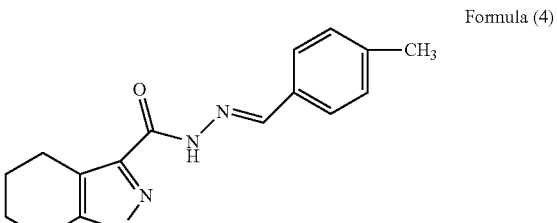

Formula (5)

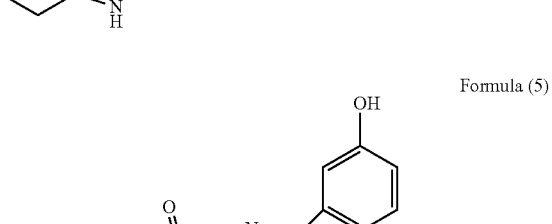

Formula (6)

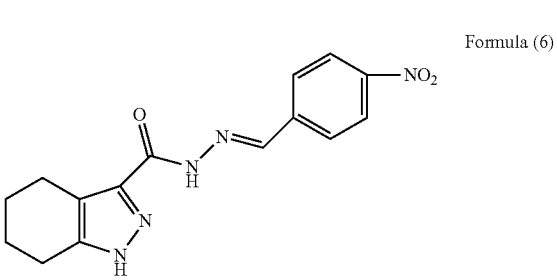

Formula (7)

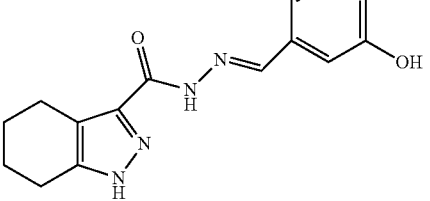

-continued

Formula (8)
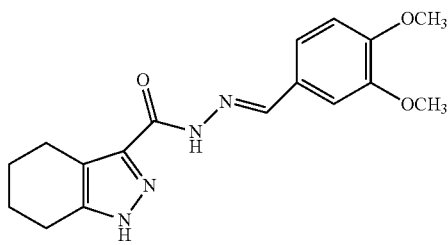

Formula (9)
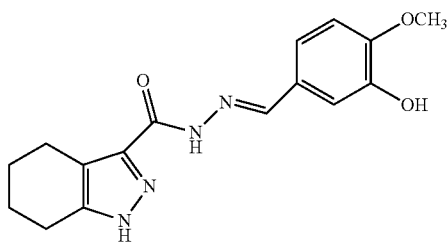

Formula (10)
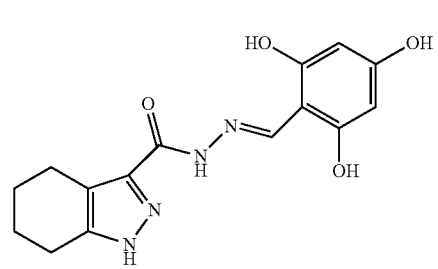

Formula (11)
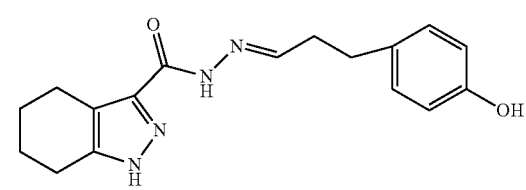

Formula (12)
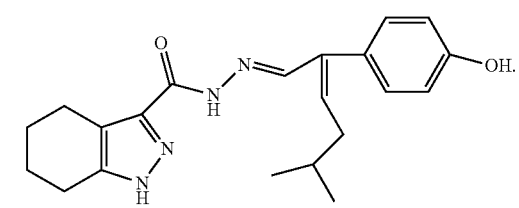

The present disclosure also provides use of the above-mentioned indazole hydrazide compound as an integrin αvβ3 receptor antagonist.

The present disclosure also provides use of the above indazole hydrazide compound in the manufacture of a tumor drug.

Preferably, the tumor is one or more of prostate cancer, melanoma and ovarian cancer.

Preferably, the tumor is a tumor resistant to enzalutamide treatment.

The present disclosure provides use of the above-mentioned indazole hydrazide compound in the manufacture of an anti-tumor angiogenesis drug.

Preferably, R is selected from substituted phenyl;

substituent in the substituted phenyl is selected from one or more of C1-C5 alkyl, C2-C5 alkenyl, hydroxyl, halogen, amino, cyano, C1-C5 alkoxy, nitro and C1-C5 haloalkyl.

Preferably, substituent in the substituted phenyl is selected from one or more of halogen, nitro, hydroxyl, amino, cyano, methyl, ethyl, n-propyl, isopropyl, n-butyl, isobutyl, tert-butyl, methoxy, ethoxy, n-propoxy and isopropoxy.

Preferably, the indazole hydrazide compound has a structure represented by formula (I-3) or formula (I-4):

Formula (I-3)
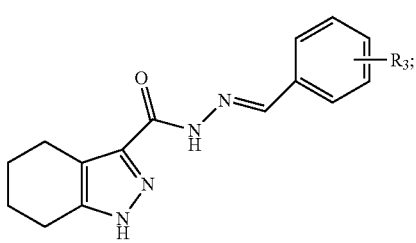

Formula (I-4)
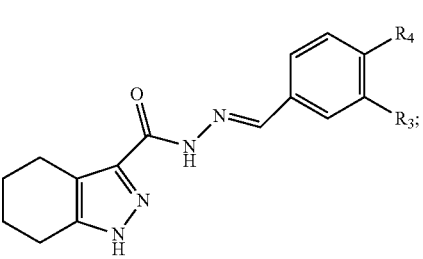

wherein, $R_3$, $R_4$, $R_5$ are independently selected from C1-C5 alkyl, C2-C5 alkenyl, hydroxyl, halogen, amino, cyano, C1-C5 alkoxy, nitro and C1-C5 haloalkyl.

Preferably, $R_3$, $R_4$, $R_5$ are independently selected from C1-C3 alkyl, C2-C3 alkenyl, hydroxyl, halogen, amino, cyano, C1-C3 alkoxy, nitro and C1-C3 haloalkyl.

Preferably, the indazole hydrazide compound has any one of the following structures:

Formula (4)
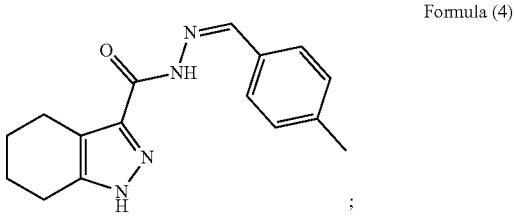

Formula (7)
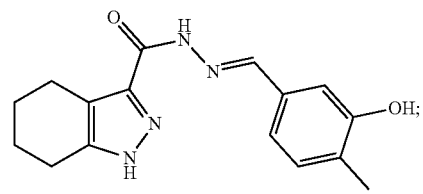

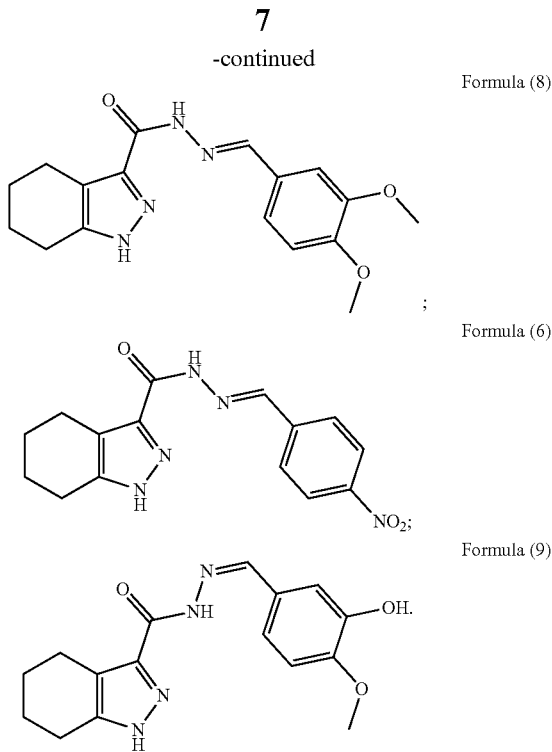

The present disclosure provides an indazole hydrazide compound, as represented in formula (I); wherein, R is selected from substituted alkyl, substituted alkenyl and substituted phenyl; substituent in the substituted alkyl and substituted alkenyl includes phenyl and/or substituted phenyl; R' is selected from H and alkyl. Compared with the prior art, the indole hydrazide compound provided by the present disclosure can be used as integrin αvβ3 receptor antagonist. Besides, it has obvious anti-prostate cancer activity and has a significant inhibitory effect on enzalutamide-resistant cell lines.

Experiments show that KD value of the indazole hydrazide compound represented by formula (5) interacting with the protein αvβ3 is 158 nM; the indazole hydrazide compound represented by formula (5) is effective on a variety of tumor cells, including prostate cancer, melanoma, ovarian cancer, etc., and also has an inhibitory effect on vascular endothelial cells. In addition, a combined drug study was conducted on 22RV1 cells resistant to enzalutamide in prostate cancer, and it is found that the indazole hydrazide compound represented by formula (5) has a synergistic effect with enzalutamide.

The present disclosure provides use of an indazole hydrazide compound in the manufacture of an anti-tumor angiogenesis drug. The indazole hydrazide compound has the structure shown in formula I. The present disclosure evaluates the anti-angiogenesis effects of such compounds on human umbilical vein endothelial cells and tumor-induced angiogenesis model. Experimental results show that the above-mentioned compound has obvious anti-tumor angiogenesis activity. Therefore, the above-mentioned indazole hydrazide compound can be used in the manufacture of an anti-tumor angiogenesis drug for inhibiting tumor angiogenesis.

BRIEF DESCRIPTION OF DRAWINGS

FIG. 19 is a schematic diagram of the preparation and dilution of the indazole hydrazide compounds in Example 2 of the present disclosure;

FIG. 20 is a schematic diagram of addition of the drug to be tested in Example 2 of the present disclosure;

DETAILED DESCRIPTION

Figure 1:
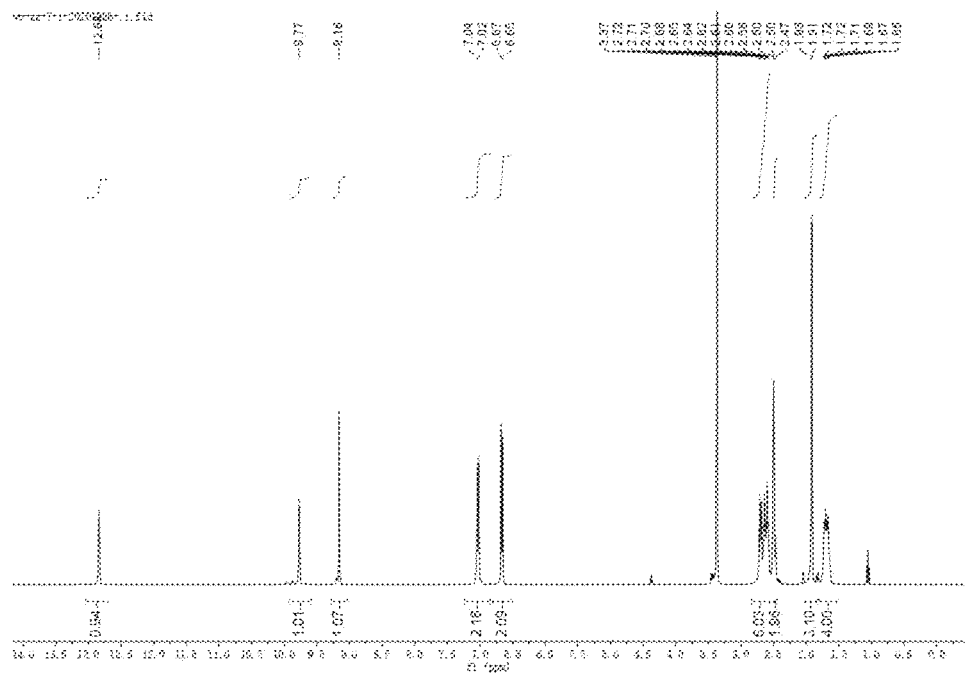
FIG. 1 is a hydrogen nuclear magnetic resonance spectrum of the compound represented by formula (1) in Example 1 of the present disclosure.

The technical solutions in the embodiments of the present disclosure will be clearly and completely described below in conjunction with the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

The present disclosure provides an indazole hydrazide compound, as shown in formula (I):

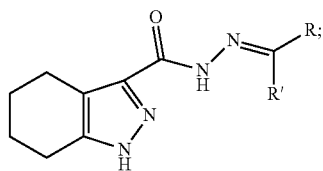

Formula (I)

wherein, R is selected from substituted alkyl, substituted alkenyl and substituted phenyl, preferably substituted C2-C10 alkyl, substituted C2-C10 alkenyl and substituted phenyl, more preferably substituted C2-C8 alkyl, substituted C2-C8 alkenyl and substituted phenyl, even more preferably substituted C2-C6 alkyl, substituted C2-C6 alkenyl and substituted phenyl; substituent in the substituted alkyl and substituted alkenyl includes phenyl and/or substituted phenyl.

R' is H or alkyl, preferably H or C1-C10 alkyl, more preferably H or C1-C5 alkyl, even more preferably H or C1-C3 alkyl, most preferably H or methyl.

According to the present disclosure, substituent in the substituted phenyl is preferably one or more of C1-C5 alkyl, C1-C5 alkenyl, hydroxyl, C1-C5 alkoxy, nitro and C1-C5 haloalkyl, more preferably one or more of C1-C3 alkyl, C1-C3 alkenyl, hydroxyl, C1-C3 alkoxy, nitro and C1-C3 haloalkyl, even more preferably one or more of C1-C2 alkyl, C1-C2 alkenyl, hydroxyl, C1-C2 alkoxy, nitro and C1-C2 haloalkyl; the halogen atom in the haloalkyl is preferably fluorine, chlorine, bromine or iodine, more preferably fluorine; the number of halogen atom in the haloalkyl is preferably 1-3.

In the present disclosure, more specifically, the indazole hydrazide compound is one selected from formula (I-1) to formula (I-5):

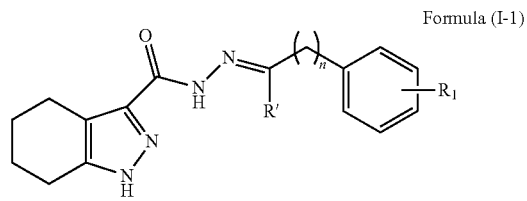

Formula (I-1)

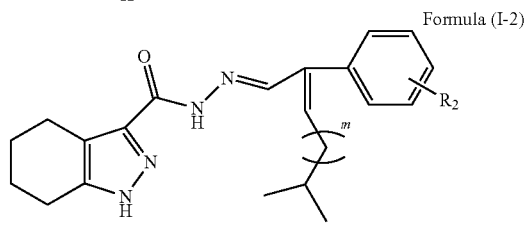

Formula (I-2)

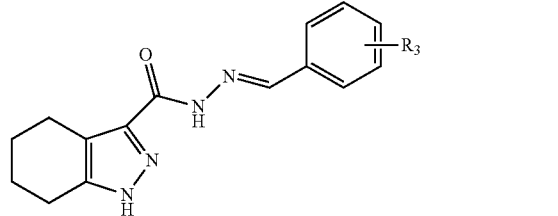

Formula (I-3)

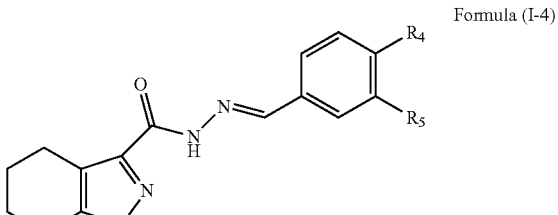

Formula (I-4)

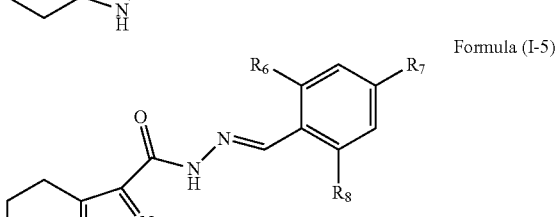

Formula (I-5)

wherein, n and m are each independently an integer from 1 to 5, more preferably an integer from 1 to 4, even more preferably an integer from 1 to 3, and most preferably 1 or 2.

$R_1$-$R_8$ are each independently selected from C1-C5 alkyl, C1-C5 alkenyl, hydroxyl, C1-C5 alkoxy, nitro and C1-C5 haloalkyl, more preferably one or more of C1-C3 alkyl, C1-C3 alkenyl, hydroxyl, C1-C3 alkoxy, nitro and C1-C3 haloalkyl, even more preferably one or more of C1-C2 alkyl, C1-C2 alkenyl, hydroxyl, C1-C2 alkoxy, nitro and C1-C2 haloalkyl; the halogen atom in the haloalkyl is preferably fluorine, chlorine, bromine or iodine, more preferably fluorine; the number of halogen atom in the haloalkyl is preferably 1-3.

Most preferably, the indazole hydrazide compound is one selected from formula (1) to formula (12):

Formula (1)

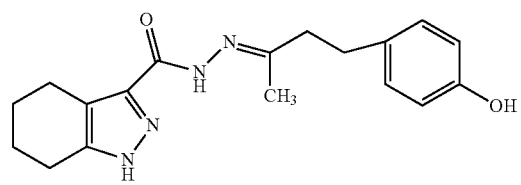

Formula (2)

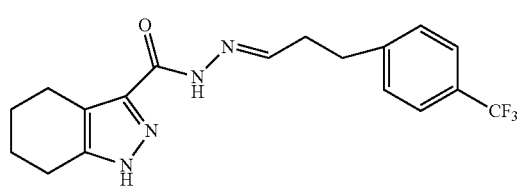

Formula (3)

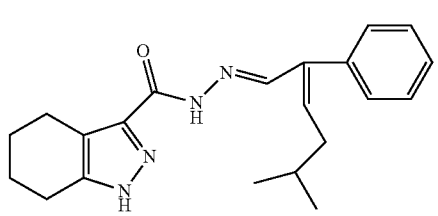 [SMILES: CC(C)C/C=C(/C=N/NC(=O)c1n[nH]c2c1CCCC2)c1ccccc1]

Formula (4)

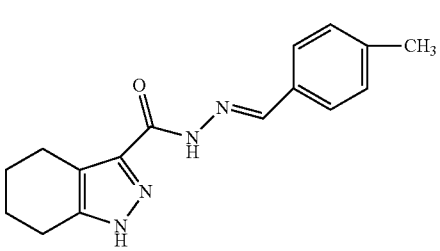

Formula (5)

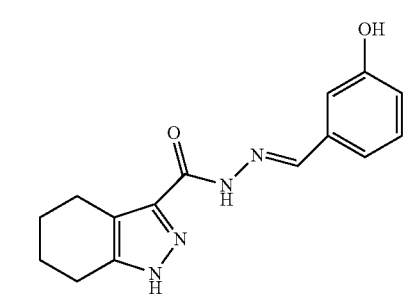

Formula (6)

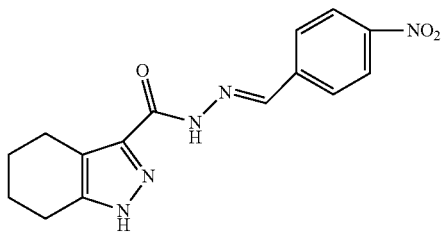

Formula (7)

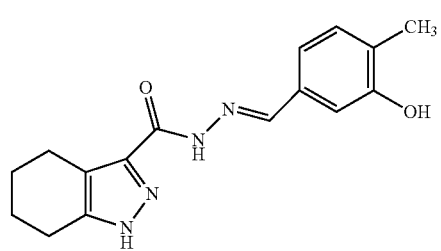

Formula (8)

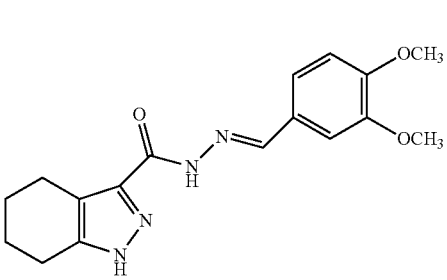

Formula (9)

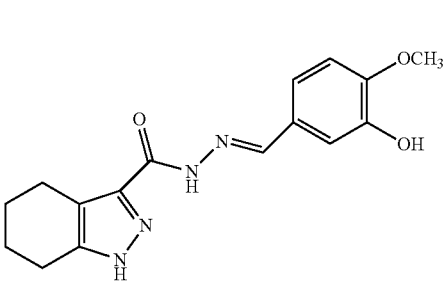

Formula (10)

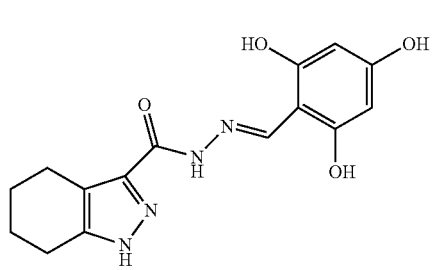

Formula (11)

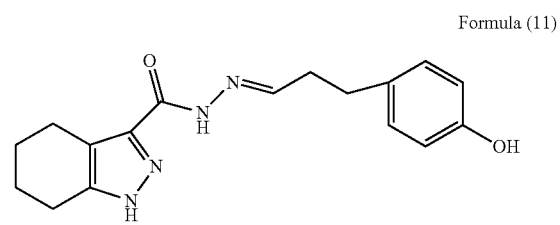

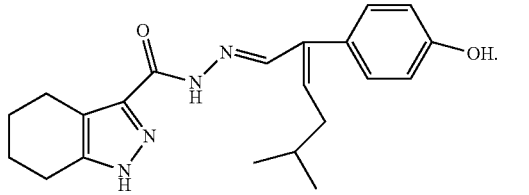

Formula (12)

The indole hydrazide compound provided by the present disclosure can be used as an integrin αvβ3 receptor antagonist. Besides, it has obvious anti-prostate cancer activity, and has a significant inhibitory effect on enzalutamide-resistant cell lines.

The present disclosure also provides a method for preparing the above-mentioned indazole hydrazide compound, comprising: reacting the compound represented by formula (II) with RCOR' to obtain the compound represented by formula (I).

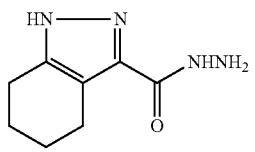

Formula (II)

The compound represented by formula (II) and RCOR' are preferably reacted in a solvent; the solvent is preferably an alcohol solvent, more preferably ethanol; the reaction is preferably a reflux reaction; the molar ratio of the compound represented by formula (II) to RCOR' is preferably 1:(1-1.2); in the embodiment provided by the present disclosure, it is specifically 1:1.1.

The compound represented by formula (II) is preferably prepared according to the following steps: the compound represented by formula (III) is reacted with hydrazine to obtain the compound represented by formula (II).

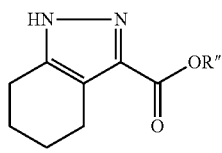

Formula (III)

Wherein, R" is C1-C5 alkyl, more preferably C1-C4 alkyl, and even more preferably ethyl.

The compound represented by formula (III) and hydrazine are preferably reacted in a solvent; the solvent is preferably an alcohol solvent, more preferably ethanol; the molar ratio of the compound represented by formula (III) to hydrazine is preferably 1: (6-8), more preferably 1:7; the reaction is preferably a reflux reaction; the reaction time is preferably 20-30 h; after the reaction, the solvent is removed and the reaction system is washed with ethyl acetate and water to obtain the compound represented by formula (II).

The compound represented by formula (III) is preferably prepared according to the following steps: the compound represented by formula (IV) and hydrazine are heated for reaction in acetic acid to obtain the compound represented by formula (III).

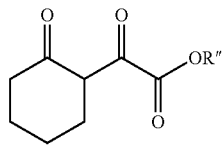

Formula (IV)

The molar ratio of the compound represented by formula (IV) to the hydrazine is preferably 1: (1-1.2), more preferably 1: (1.1-1.2). The heating reaction is preferably a reflux reaction. The heating reaction time is preferably 40-70 min, more preferably 60 min. After the heating reaction, the reaction system is preferably poured into ice water, neutralized with sodium bicarbonate and extracted with ethyl acetate. After the extract is concentrated, it is purified by column chromatography using a mixture of n-hexane and ethyl acetate to obtain the compound represented by formula (III). The volume ratio of n-hexane to ethyl acetate is preferably 3:1.

The compound represented by formula (IV) is preferably prepared according to the following steps: reacting cyclohexanone with (COOR') in sodium ethoxide solution, then decomposing the reaction mixture with sulfuric acid solution, and extracting with ethyl acetate, concentrating the extract, and then purifying it by column chromatography using a mixture of n-hexane and ethyl acetate to obtain the compound represented by formula (IV). The reaction time is preferably 10-14 h, more preferably 12 h. The volume ratio of n-hexane to ethyl acetate is preferably 12:1.

The present disclosure also provides use of the above-mentioned indazole hydrazide compound as an integrin αvβ3 receptor antagonist.

The present disclosure also provides use of the above-mentioned indazole hydrazide compound in the manufacture of a tumor drug.

The tumor is preferably one or more of prostate cancer, melanoma and ovarian cancer.

More specifically, the tumor is preferably a tumor resistant to enzalutamide treatment.

More specifically, the present disclosure provides use of the above-mentioned indazole hydrazide compound in the manufacture of a medicament for inhibiting tumor cells 22RV1, 22RV1-SPP1 and LNCaP.

The present disclosure provides use of the above-mentioned indazole hydrazide compound in the manufacture of an anti-tumor angiogenesis drug.

The above-mentioned indazole hydrazide compound has the structure shown in formula I:

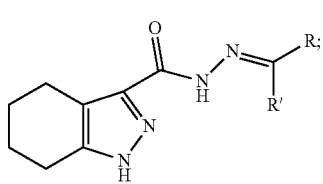

Formula I wherein, R is selected from substituted alkyl, substituted alkenyl and substituted phenyl, preferably substituted C2-C10 alkyl, substituted C2-C10 alkenyl and substituted phenyl, more preferably substituted C2-C8 alkyl, substituted C2-C8 alkenyl and substituted phenyl, even more preferably substituted C2-C6 alkyl, substituted C2-C6 alkenyl and substituted phenyl; substituent in the substituted alkyl and substituted alkenyl includes phenyl and/or substituted phenyl.

R' is H or alkyl, preferably H or C1-C10 alkyl, more preferably H or C1-C5 alkyl, even more preferably H or C1-C3 alkyl, most preferably H or methyl.

According to the present disclosure, substituent in the substituted phenyl group is preferably one or more of C1-C5 alkyl, C2-C5 alkenyl, hydroxyl, halogen, amino, cyano, C1-C5 alkoxy, nitro and C1-C5 haloalkyl, more preferably one or more of C1-C3 alkyl, C2-C3 alkenyl, hydroxyl, halogen, amino, cyano, C1-C3 alkoxy, nitro and C1-C3 haloalkyl, even more preferably one or more of C1-C2 alkyl, vinyl, hydroxyl, halogen, amino, cyano, C1-C2 alkoxy, nitro and C1-C2 haloalkyl; the halogen atom in the haloalkyl is preferably fluorine, chlorine, bromine or iodine, more preferably fluorine; the number of halogen atom in the haloalkyl is preferably 1-3.

In some specific embodiments of the present disclosure, substituent in the substituted phenyl is selected from one or more of halogen, nitro, hydroxyl, amino, cyano, methyl, ethyl, n-propyl, isopropyl, n-butyl, isobutyl, tert-butyl, methoxy, ethoxy, n-propoxy and isopropoxy.

In the present disclosure, more specifically, the indazole hydrazide compound has a structure represented by formula (I-3) or formula (I-4):

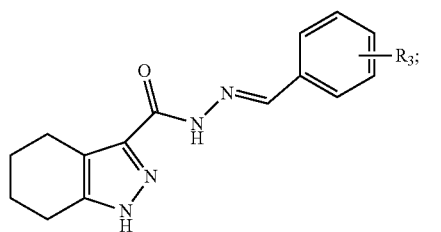

Formula (I-3)

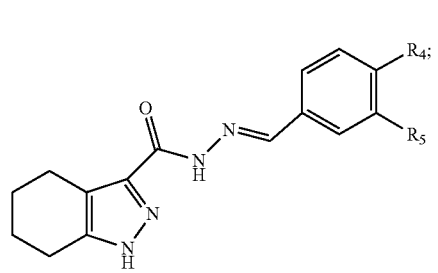

Formula (I-4)

wherein, $R_3$, $R_4$, $R_5$ are independently selected from C1-C5 alkyl, C2-C5 alkenyl, hydroxyl, halogen, amino, cyano, C1-C5 alkoxy, nitro and C1-C5 haloalkyl, more preferably C1-C3 alkyl, C2-C3 alkenyl, hydroxyl, halogen, amino, cyano, C1-C3 alkoxy, nitro and C1-C3 haloalkyl, even more preferably one or more of C1-C2 alkyl, vinyl, hydroxy, halogen, amino, cyano, C1-C2 alkoxy, nitro and C1-C2 haloalkyl; the halogen atom in the haloalkyl is preferably fluorine, chlorine, bromine or iodine, more preferably fluorine; the number of halogen atom in the haloalkyl is preferably 1-3.

Most preferably, the indazole hydrazide compound has any one of the following structures:

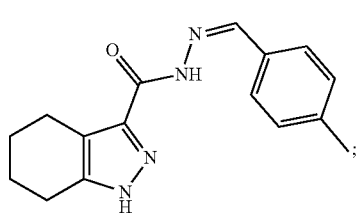

Formula (4)

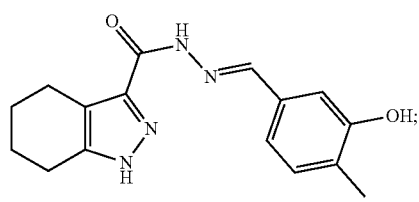

Formula (7)

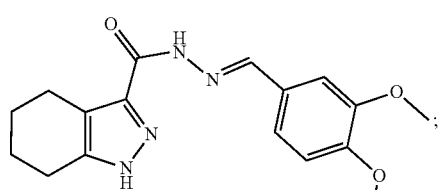

Formula (8)

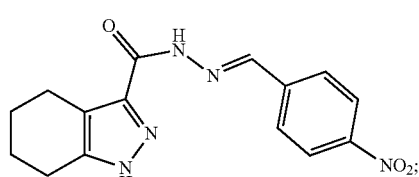

Formula (6)

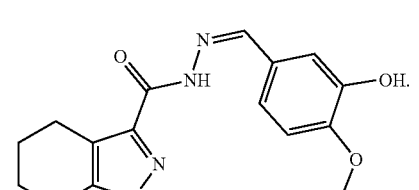

Formula (9)

In order to further illustrate the present disclosure, an indazole hydrazide compound and an application thereof provided by the present disclosure will be described in detail below in conjunction with examples.

The reagents used in the following examples are all commercially available.

Example 1

The compounds represented by formula (1), and formula (2) to formula (10) are prepared according to the following steps:

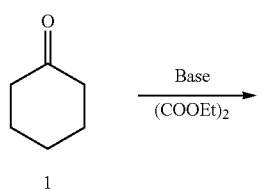

1

-continued

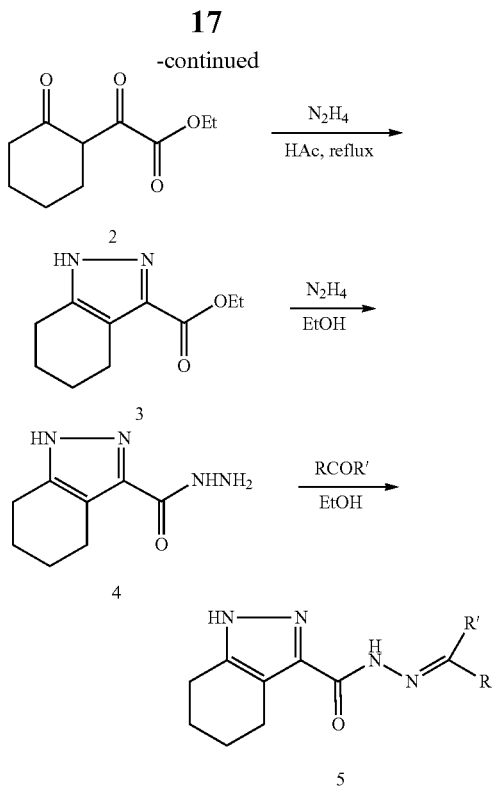

Sodium (1.5 g, 65 mmol) was added to absolute ethanol (20 mL) at 0° C. to prepare a sodium ethoxide solution. Then a mixture of cyclohexanone (4.41 g, 44 mmol) and diethyl oxalate (7.3 g, 50 mmol) was slowly added. The solution was stirred at room temperature for 12 h. After decomposed with 2 N sulfuric acid solution, the reaction mixture was extracted with ethyl acetate and dried. The organic solvent was concentrated. The resulting crude was further purified by column chromatography with n-hexane:ethyl acetate (12:1) to obtain product 2 (5.87 g, 67%) as a yellow oil.

Hydrazine (448 mg, 14 mmol) was slowly added to the product 2 (2.38 g, 12 mmol) in cooling acetic acid (5 mL) suspension. The mixture was heated to reflux for 1 h, poured into ice water, neutralized with $NaHCO_3$, and extracted with ethyl acetate. The organic phase was combined, dried ($Na_2SO_4$), filtered and concentrated. Then the residue was purified with n-hexane:ethyl acetate (3:1) column chromatography to obtain product 3 (2 g, 86%) as a white solid.

The product 3 (970 mg, 5 mmol) and hydrazine (1.34 g, 35 mmol) were heated to reflux in ethanol (10 mL) for 1 day. After the reflux, the ethanol was evaporated, and the precipitate was collected by filtration, washed with ethyl acetate and water to obtain hydrazide 4 (580 mg, 64%) as a white solid.

The hydrazide 4 (72 mg, 0.4 mmol) and the substituted aldehyde RCOR' (0.44 mmol) were refluxed in ethanol (3 mL) to obtain the precipitate compound 5. The precipitate was then collected by filtration and washed with cold ethanol (81%).

Figure 2:
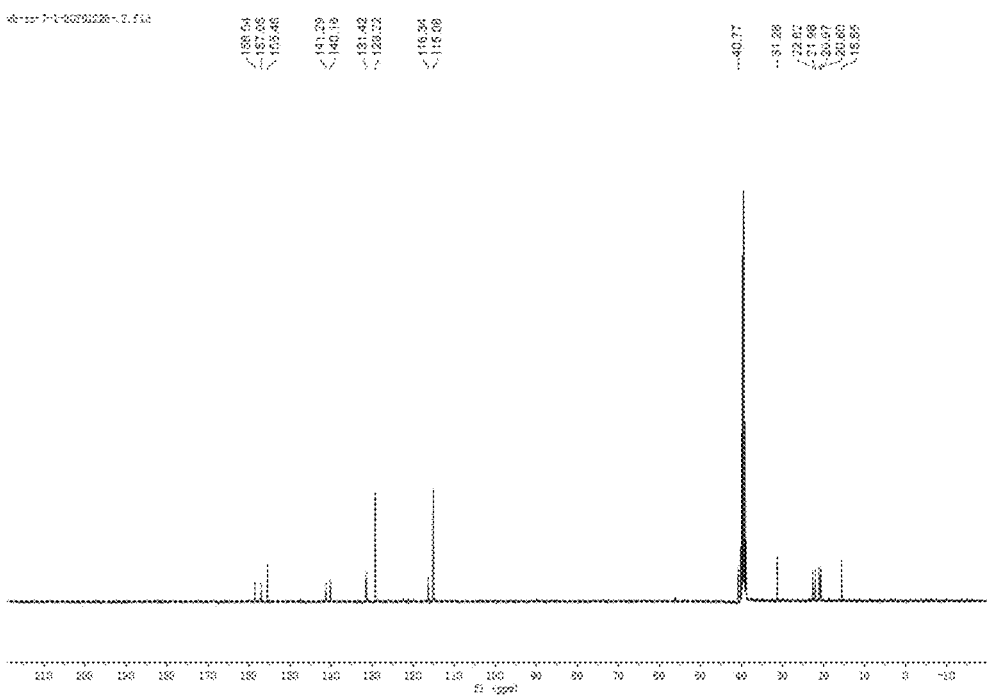
FIG. 2 is a carbon nuclear magnetic resonance spectrum of the compound represented by formula (1) in Example 1 of the present disclosure.
Figure 3:
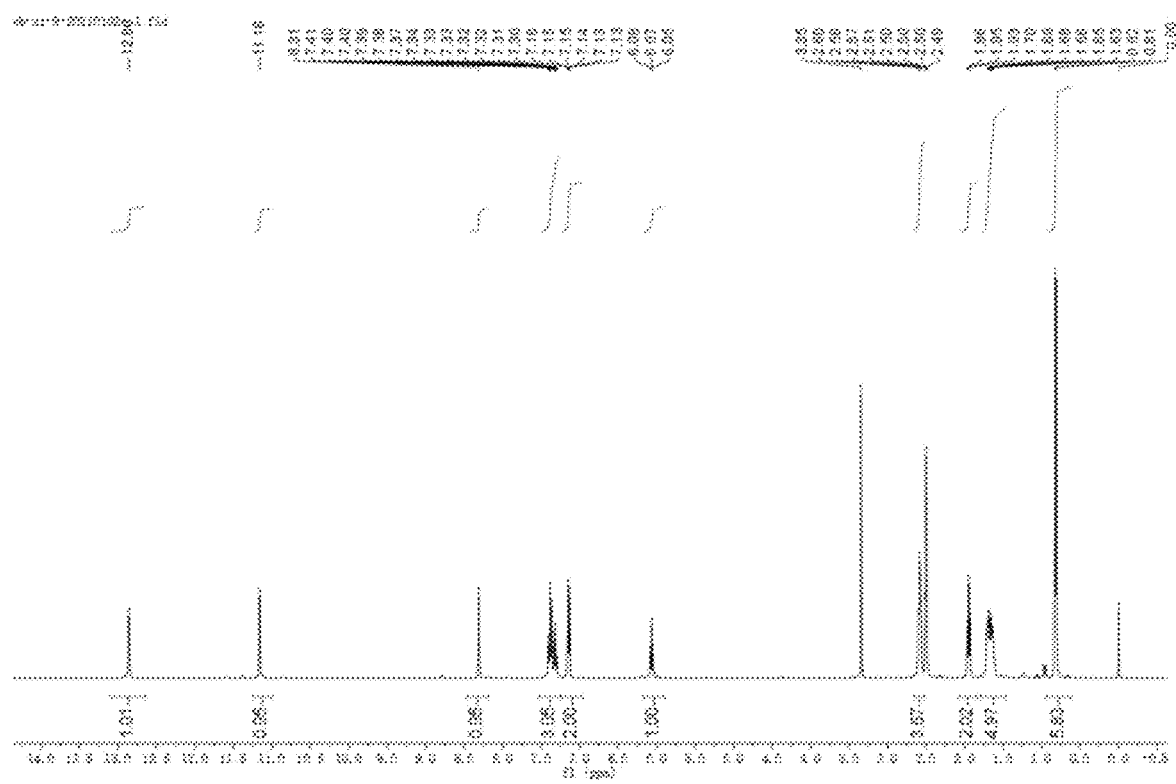
FIG. 3 is a hydrogen nuclear magnetic resonance spectrum of the compound represented by formula (3) in Example 1 of the present disclosure.
Figure 4:
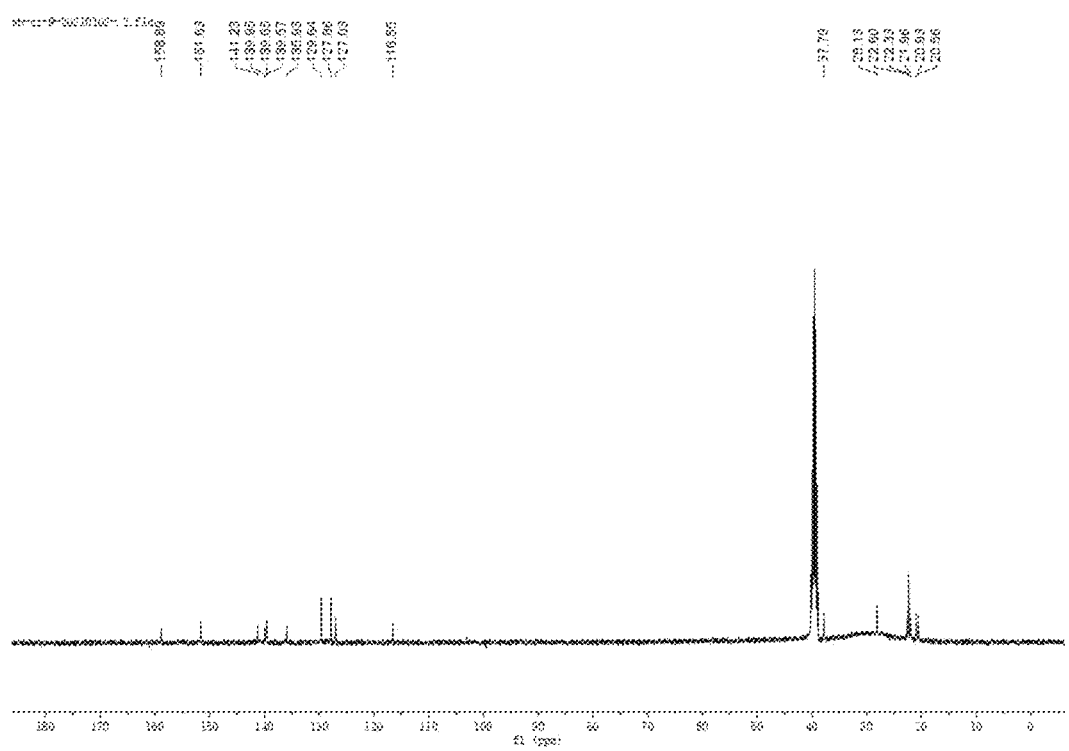
FIG. 4 is a carbon nuclear magnetic resonance spectrum of the compound represented by formula (3) in Example 1 of the present disclosure.
Figure 5:
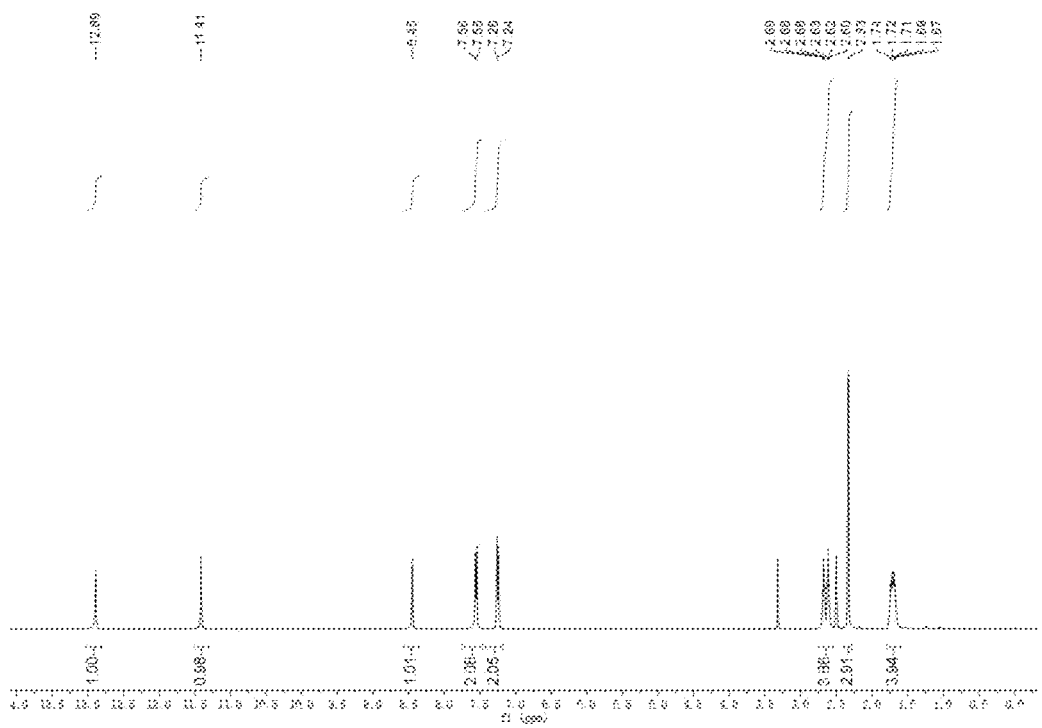
FIG. 5 is a hydrogen nuclear magnetic resonance spectrum of the compound represented by formula (4) in Example 1 of the present disclosure.
Figure 6:
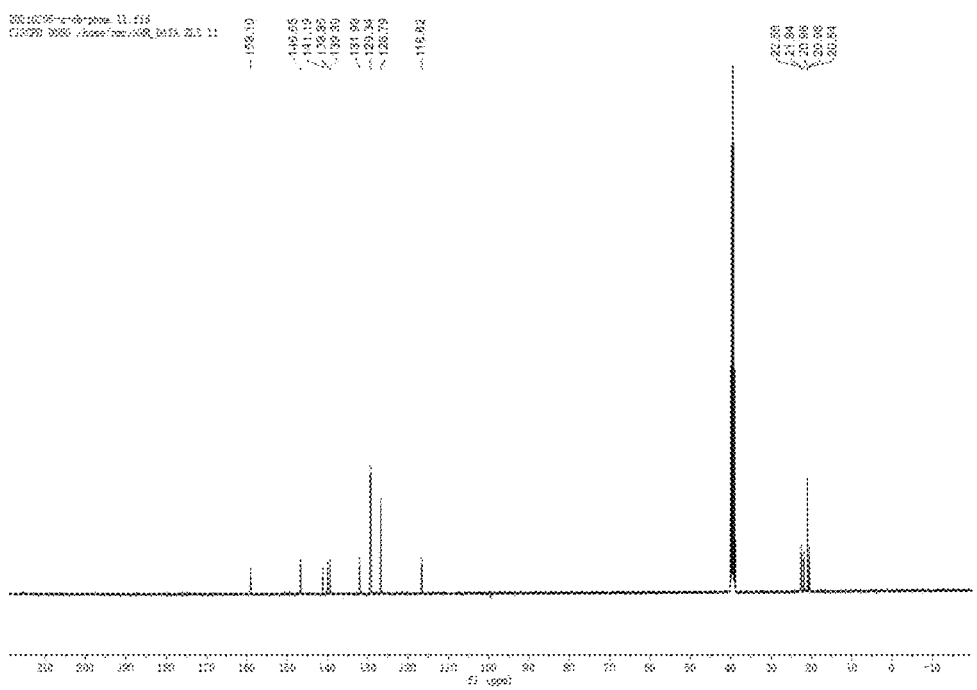
FIG. 6 is a carbon nuclear magnetic resonance spectrum of the compound represented by formula (4) in Example 1 of the present disclosure.
Figure 7:
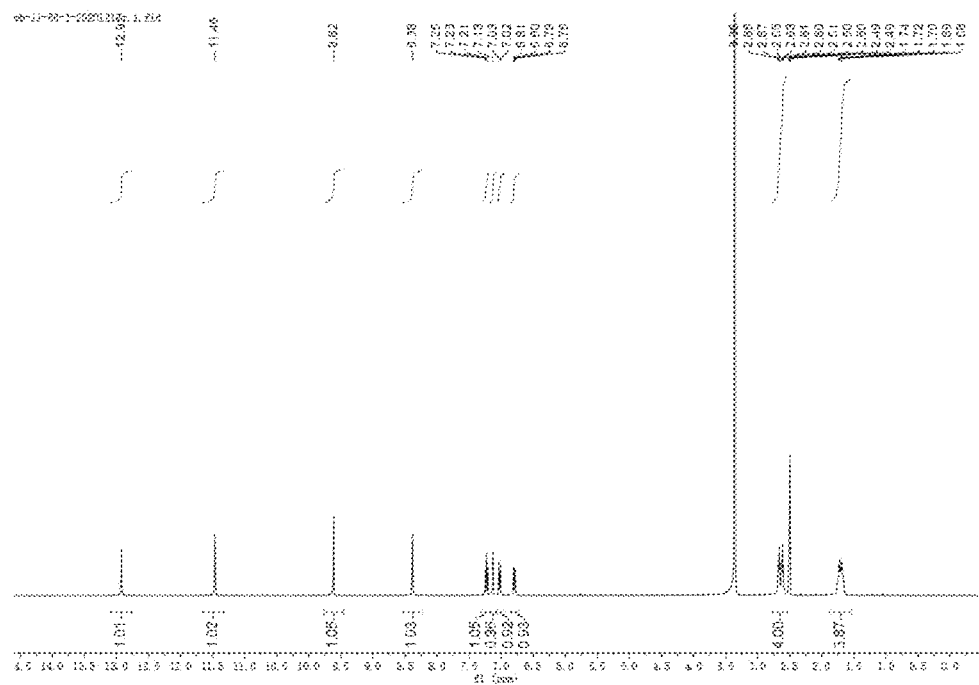
FIG. 7 is a hydrogen nuclear magnetic resonance spectrum of the compound represented by formula (5) in Example 1 of the present disclosure.
Figure 8:
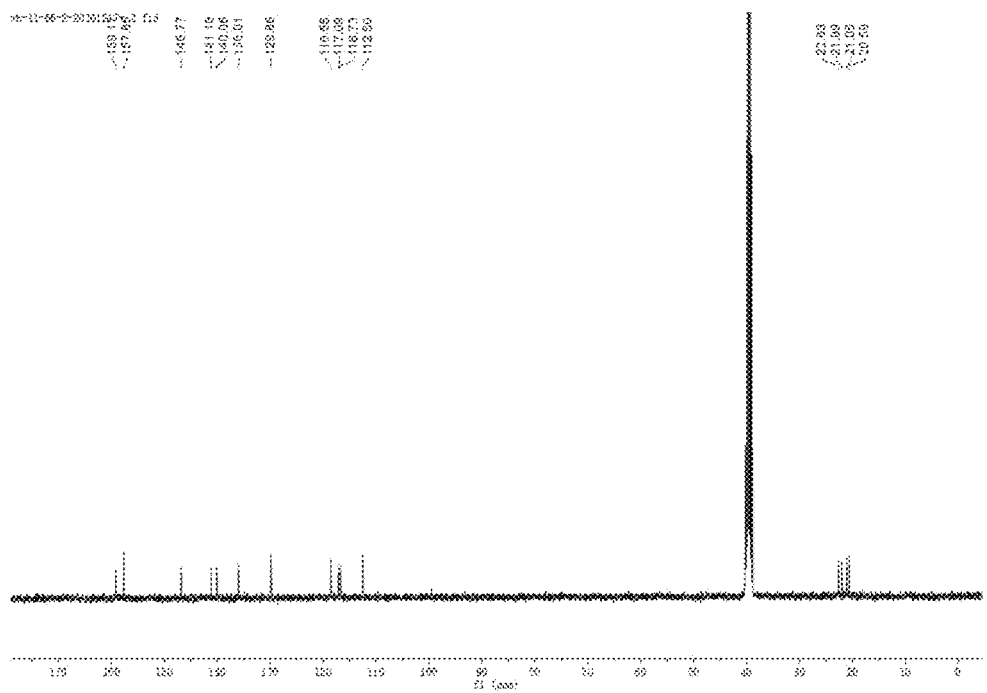
FIG. 8 is a carbon nuclear magnetic resonance spectrum of the compound represented by formula (5) in Example 1 of the present disclosure.
Figure 9:
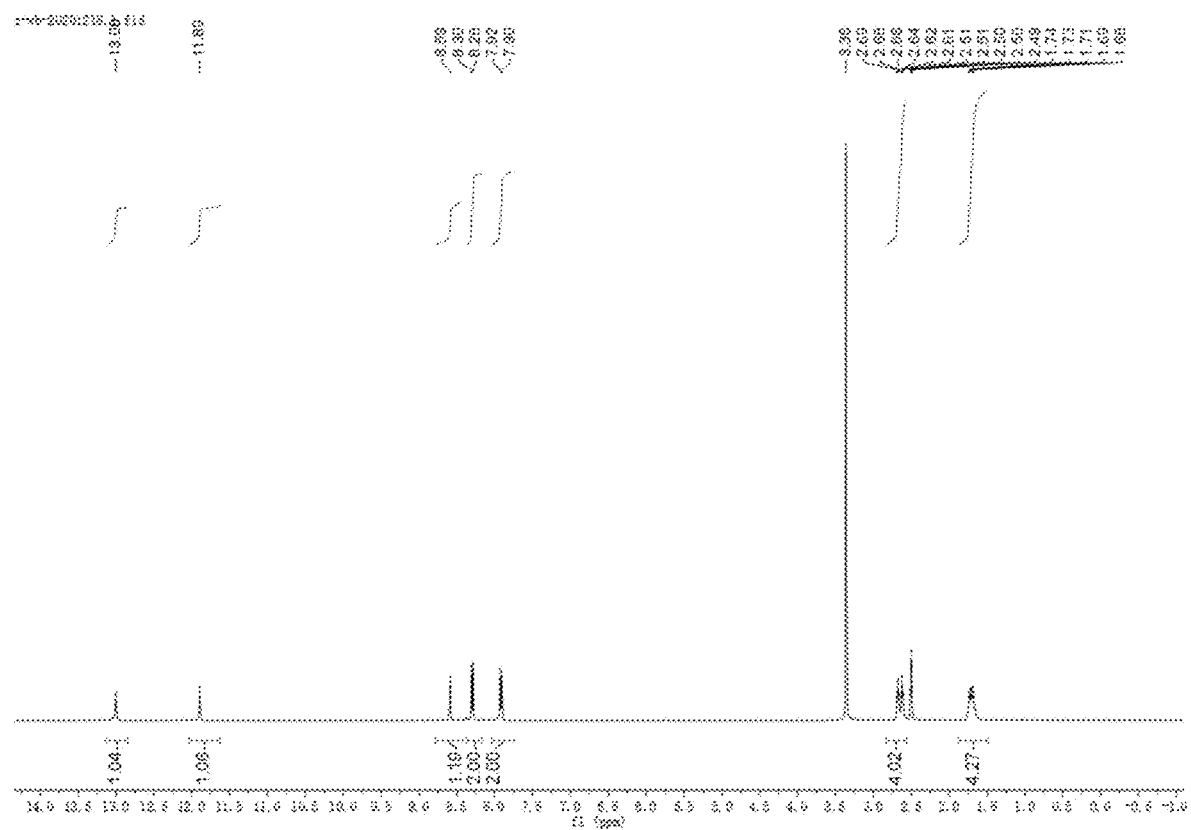
FIG. 9 is a hydrogen nuclear magnetic resonance spectrum of the compound represented by formula (6) in Example 1 of the present disclosure.
Figure 10:
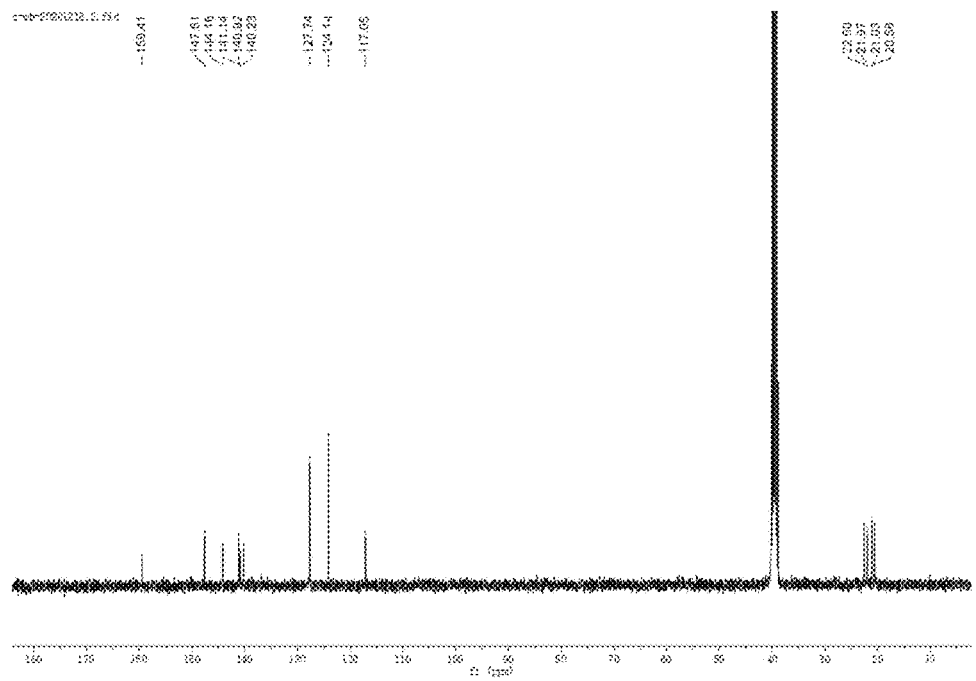
FIG. 10 is a carbon nuclear magnetic resonance spectrum of the compound represented by formula (6) in Example 1 of the present disclosure.
Figure 11:
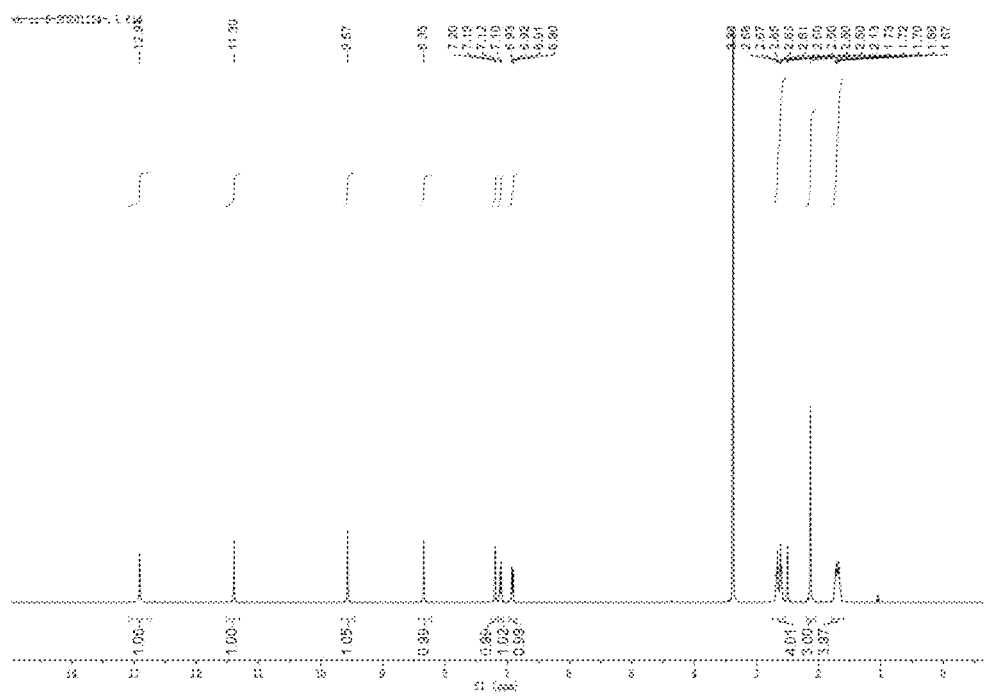
FIG. 11 is a hydrogen nuclear magnetic resonance spectrum of the compound represented by formula (7) in Example 1 of the present disclosure.
Figure 12:
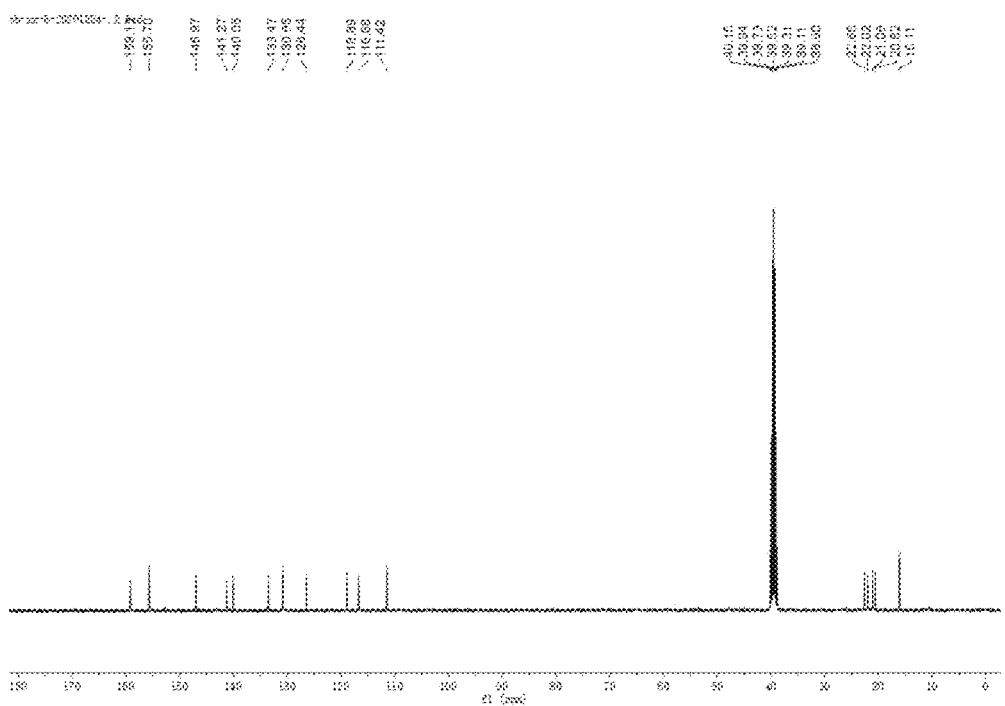
FIG. 12 is a carbon nuclear magnetic resonance spectrum of the compound represented by formula (7) in Example 1 of the present disclosure.
Figure 13:
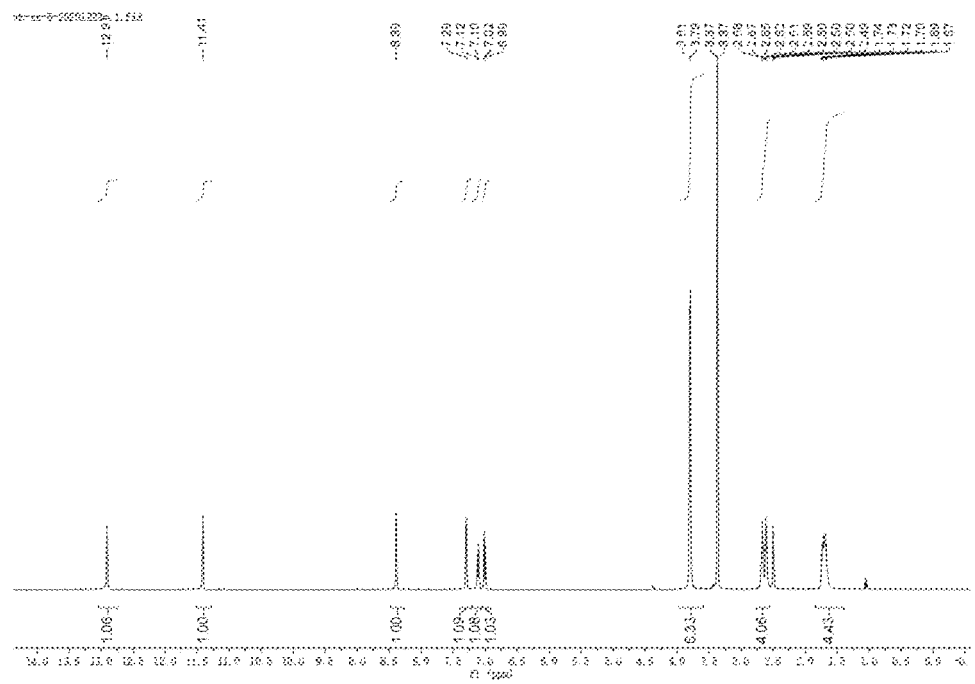
FIG. 13 is a hydrogen nuclear magnetic resonance spectrum of the compound represented by formula (8) in Example 1 of the present disclosure.
Figure 14:
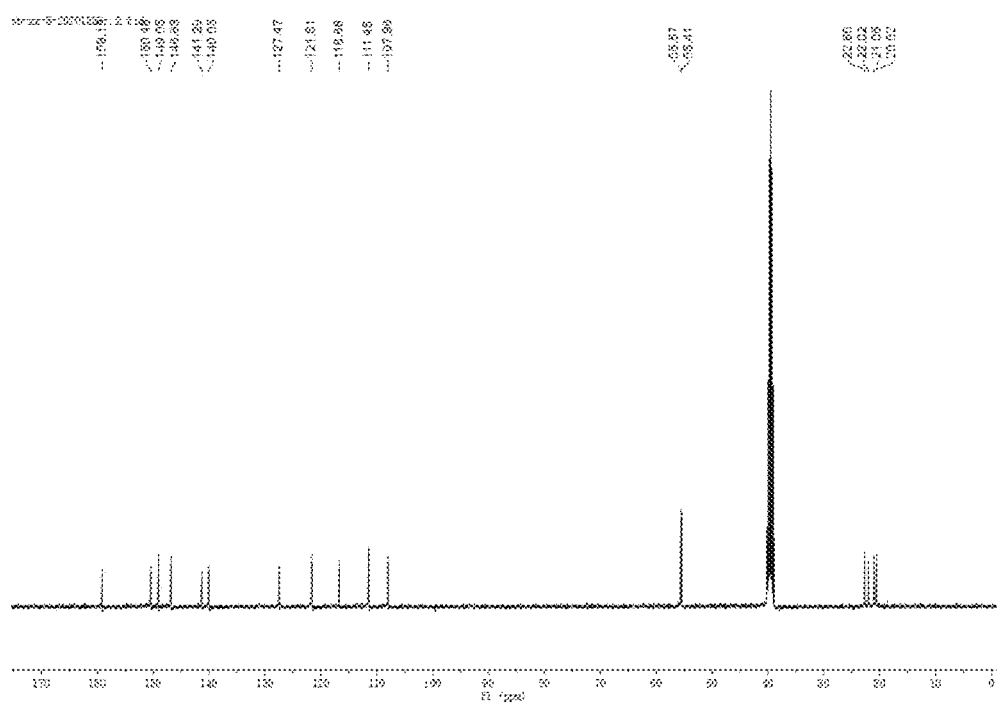
FIG. 14 is a carbon nuclear magnetic resonance spectrum of the compound represented by formula (8) in Example 1 of the present disclosure.
Figure 15:
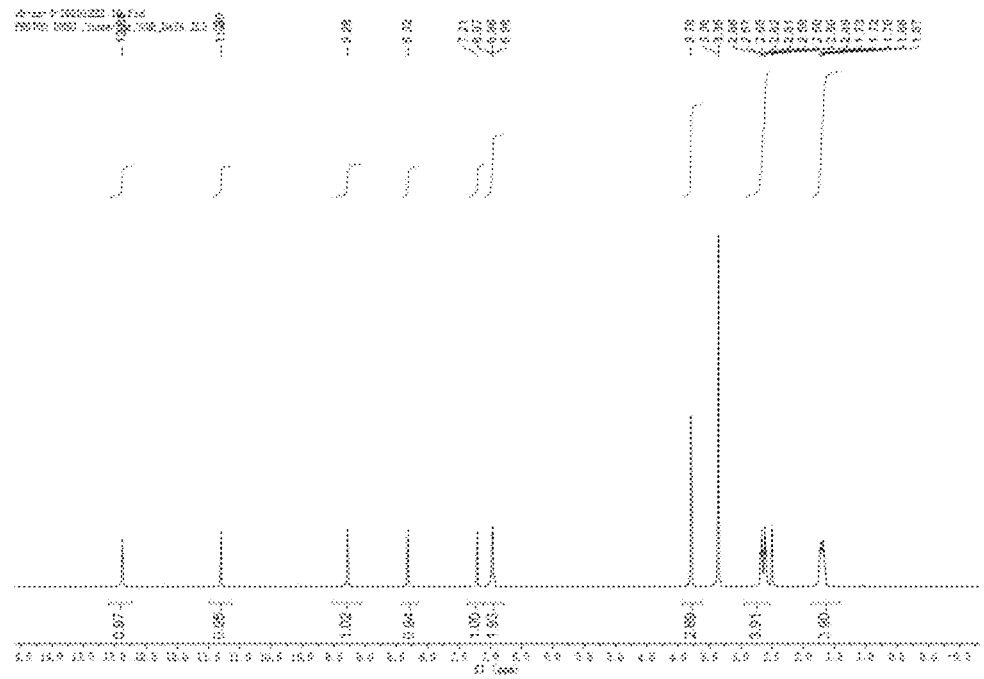
FIG. 15 is a hydrogen nuclear magnetic resonance spectrum of the compound represented by formula (9) in Example 1 of the present disclosure.
Figure 16:
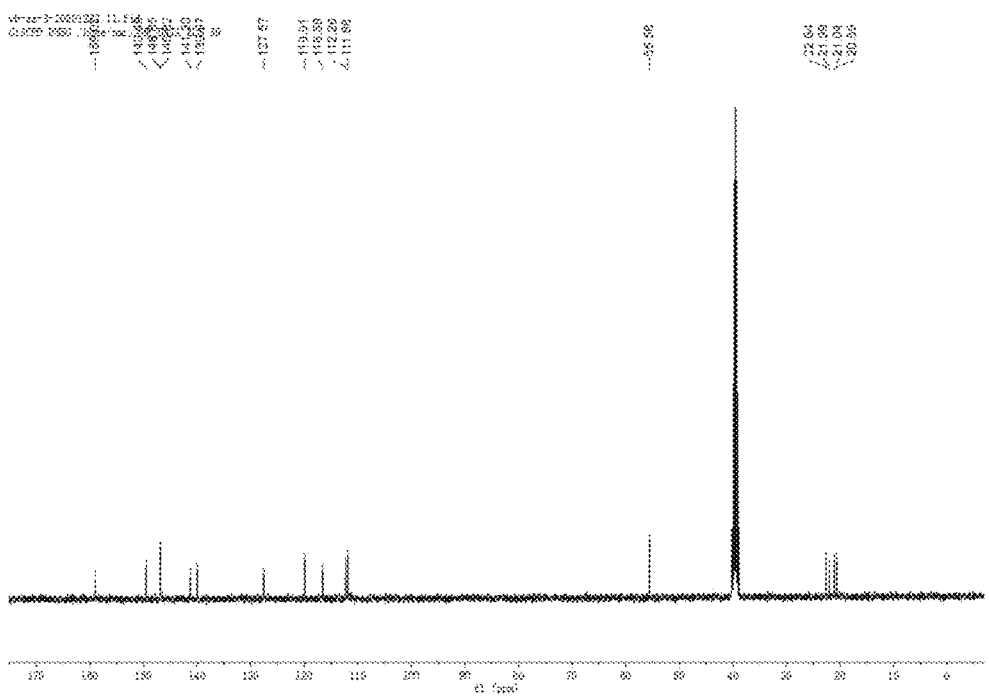
FIG. 16 is a carbon nuclear magnetic resonance spectrum of the compound represented by formula (9) in Example 1 of the present disclosure.
Figure 17:
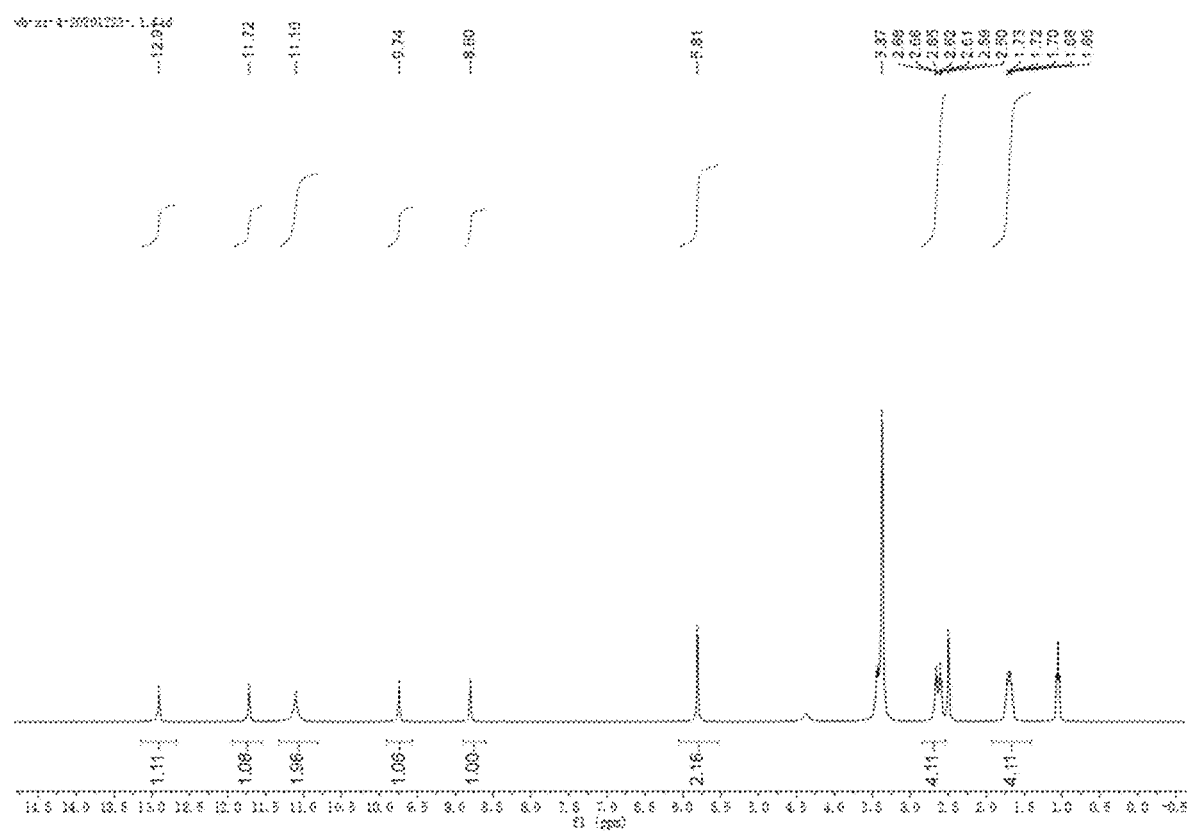
FIG. 17 is a hydrogen nuclear magnetic resonance spectrum of the compound represented by formula (10) in Example 1 of the present disclosure.
Figure 18:
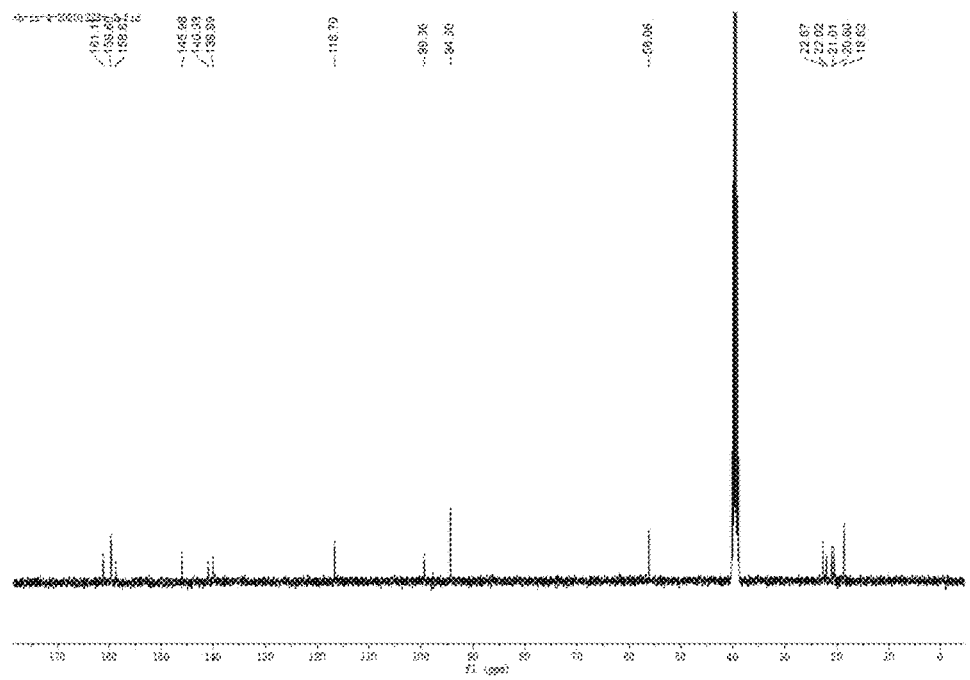
FIG. 18 is a carbon nuclear magnetic resonance spectrum of the compound represented by formula (10) in Example 1 of the present disclosure.

The obtained compounds represented by formula (1), and formula (3) to formula (10) were analyzed by nuclear magnetic resonance, and the obtained spectra are shown in FIGS. 1-18; where FIG. 1 is a hydrogen nuclear magnetic resonance spectrum of the compound represented by formula (1); FIG. 2 is a carbon nuclear magnetic resonance spectrum of the compound represented by formula (1); FIG. 3 is a hydrogen nuclear magnetic resonance spectrum of the compound represented by formula (3); FIG. 4 is a carbon nuclear magnetic resonance spectrum of the compound represented by formula (3); FIG. 5 is a hydrogen nuclear magnetic resonance spectrum of the compound represented by formula (4); FIG. 6 is a carbon nuclear magnetic resonance spectrum of the compound represented by formula (4); FIG. 7 is a hydrogen nuclear magnetic resonance spectrum of the compound represented by formula (5); FIG. 8 is a carbon nuclear magnetic resonance spectrum of the compound represented by formula (5); FIG. 9 is a hydrogen nuclear magnetic resonance spectrum of the compound represented by formula (6); FIG. 10 is a carbon nuclear magnetic resonance spectrum of the compound represented by formula (6); FIG. 11 is a hydrogen nuclear magnetic resonance spectrum of the compound represented by formula (7); FIG. 12 is a carbon nuclear magnetic resonance spectrum of the compound represented by formula (7); FIG. 13 is a hydrogen nuclear magnetic resonance spectrum of the compound represented by formula (8); FIG. 14 is a carbon nuclear magnetic resonance spectrum of the compound represented by formula (8); FIG. 15 is a hydrogen nuclear magnetic resonance spectrum of the compound represented by formula (9); FIG. 16 is a carbon nuclear magnetic resonance spectrum of the compound represented by formula (9); FIG. 17 is a hydrogen nuclear magnetic resonance spectrum of the compound represented by formula (10); FIG. 18 is a carbon nuclear magnetic resonance spectrum of the compound represented by formula (10).

The nuclear magnetic resonance results are as follows:

The indazole hydrazide compound represented by formula (1):

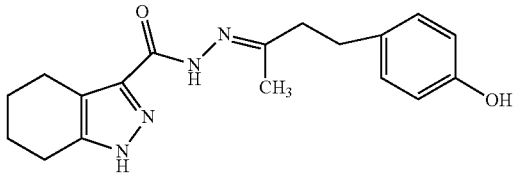

$^1$H NMR (400 MHz, DMSO-$d_6$) δ 12.84 (s, 1H), 9.77 (s, 1H), 9.16 (s, 1H), 7.03 (d, J=8.3 Hz, 2H), 6.66 (d, J=8.4 Hz, 2H), 2.75-2.56 (m, 6H), 2.50-2.45 (m, 2H), 1.91 (s, 3H), 1.76-1.60 (m, 4H).

$^{13}$C NMR (101 MHz, DMSO-$d_6$) δ 158.54, 157.05, 155.46, 141.29, 140.16, 131.42, 129.22, 116.34, 115.08, 40.77, 31.28, 22.62, 21.98, 20.97, 20.60, 15.55.

The indazole hydrazide compound represented by formula (3):

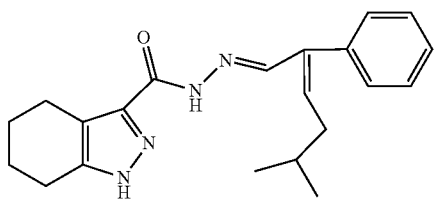

$^1$H NMR (400 MHz, DMSO-$d_6$) δ 12.86 (s, 1H), 11.16 (s, 1H), 8.31 (s, 1H), 7.43-7.28 (m, 3H), 7.17-7.12 (m, 2H), 6.07 (t, J=7.6 Hz, 1H), 2.57 (d, J=6.0 Hz, 4H), 1.95 (t, J=7.2 Hz, 2H), 1.76-1.58 (m, 5H), 0.82 (d, J=6.6 Hz, 6H).

$^{13}$C NMR (101 MHz, DMSO-$d_6$) δ 158.89, 151.63, 141.23, 139.95, 139.65, 139.57, 135.93, 129.64, 127.86, 127.03, 116.55, 37.79, 28.13, 22.60, 22.33, 21.96, 20.93, 20.56.

The indazole hydrazide compound represented by formula (4):

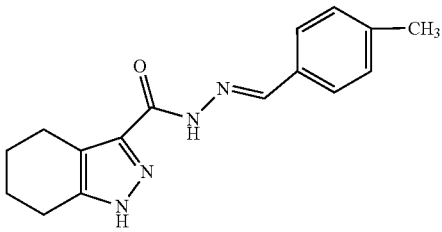 [SMILES: Cc1ccc(/C=N/NC(=O)c2n[nH]c3c2CCCC3)cc1]

¹H NMR (400 MHz, DMSO-d₆) δ 12.89 (s, 1H), 11.41 (s, 1H), 8.45 (s, 1H), 7.55 (d, J=7.8 Hz, 2H), 7.25 (d, J=7.8 Hz, 2H), 2.65 (dt, J=25.1, 6.2 Hz, 4H), 2.33 (s, 3H), 1.78-1.62 (m, 4H).

¹³C NMR (101 MHz, DMSO-d₆) δ 159.10, 146.65, 141.19, 139.95, 139.39, 131.99, 129.34, 126.79, 116.62, 22.58, 21.94, 20.96, 20.96, 20.54.

The indazole hydrazide compound represented by formula (5):

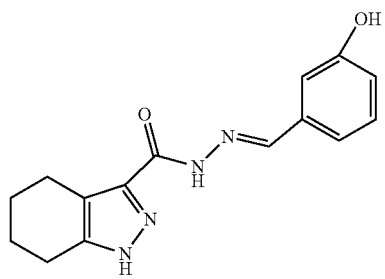 [SMILES: O=C(N/N=C/c1cccc(O)c1)c1n[nH]c2c1CCCC2]

¹H NMR (400 MHz, DMSO-d₆) δ 12.92 (s, 1H), 11.46 (s, 1H), 9.62 (s, 1H), 8.38 (s, 1H), 7.23 (t, J=7.8 Hz, 1H), 7.13 (s, 1H), 7.03 (d, J=7.5 Hz, 1H), 6.80 (dd, J=8.1, 2.4 Hz, 1H), 2.64 (dt, J=21.7, 6.1 Hz, 4H), 1.71 (dd, J=13.7, 6.6 Hz, 4H).

¹³C NMR (101 MHz, DMSO-d₆) δ 159.17, 157.65, 146.77, 141.18, 140.06, 136.01, 129.86, 118.55, 117.09, 116.73, 112.50, 22.63, 21.99, 21.05, 20.59.

The indazole hydrazide compound represented by formula (6):

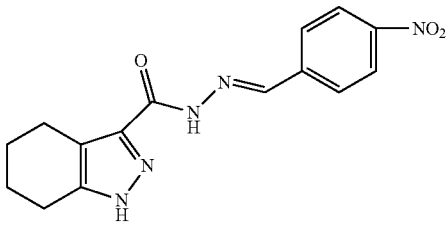 [SMILES: O=C(N/N=C/c1ccc([N+](=O)[O-])cc1)c1n[nH]c2c1CCCC2]

¹H NMR (400 MHz, DMSO-d₆) δ 13.00 (s, 1H), 11.89 (s, 1H), 8.59 (s, 1H), 8.29 (d, J=8.6 Hz, 2H), 7.91 (d, J=8.5 Hz, 2H), 2.65 (dt, J=22.2, 6.2 Hz, 4H), 1.70 (dd, J=13.7, 6.6 Hz, 4H).

¹³C NMR (101 MHz, DMSO-d₆) δ 159.41, 147.61, 144.16, 141.14, 140.92, 140.23, 127.74, 124.14, 117.05, 22.60, 21.97, 21.03, 20.58.

The indazole hydrazide compound represented by formula (7):

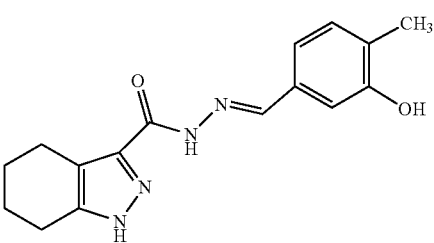 [SMILES: Cc1ccc(/C=N/NC(=O)c2n[nH]c3c2CCCC3)cc1O]

¹H NMR (400 MHz, DMSO-d₆) δ 12.91 (s, 1H), 11.39 (s, 1H), 9.57 (s, 1H), 8.35 (s, 1H), 7.20 (s, 1H), 7.11 (d, J=7.7 Hz, 1H), 6.92 (d, J=7.5 Hz, 1H), 2.64 (dt, J=22.6, 6.2 Hz, 4H), 2.13 (s, 3H), 1.71 (dd, J=13.4, 6.8 Hz, 4H).

¹³C NMR (101 MHz, DMSO-d₆) δ 159.13, 155.70, 146.97, 141.27, 140.05, 133.47, 130.85, 126.44, 118.89, 116.68, 111.42, 22.66, 22.02, 21.08, 20.62, 16.11.

The indazole hydrazide compound represented by formula (8):

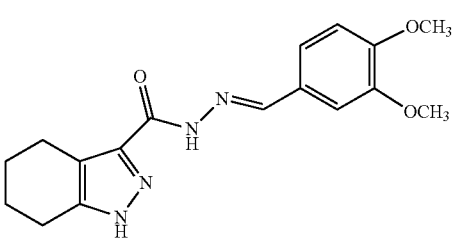 [SMILES: COc1ccc(/C=N/NC(=O)c2n[nH]c3c2CCCC3)cc1OC]

¹H NMR (400 MHz, DMSO-d₆) δ 12.91 (s, 1H), 11.41 (s, 1H), 8.39 (s, 1H), 7.29 (s, 1H), 7.11 (d, J=8.2 Hz, 1H), 7.01 (d, J=8.3 Hz, 1H), 3.81 (s, 3H), 3.79 (s, 3H), 2.64 (dt, J=23.9, 6.2 Hz, 4H), 1.71 (dq, J=12.6, 6.5, 5.0 Hz, 4H).

¹³C NMR (101 MHz, DMSO-d₆) δ 159.13, 150.48, 149.05, 146.83, 141.29, 140.05, 127.47, 121.61, 116.68, 111.45, 107.96, 55.57, 55.41, 22.66, 22.02, 21.05, 20.62.

The indazole hydrazide compound represented by formula (9):

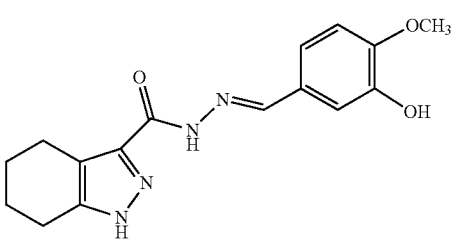 [SMILES: COc1ccc(/C=N/NC(=O)c2n[nH]c3c2CCCC3)cc1O]

¹H NMR (400 MHz, DMSO-d₆) δ 12.88 (s, 1H), 11.30 (s, 1H), 9.28 (s, 1H), 8.32 (s, 1H), 7.21 (s, 1H), 7.02-6.88 (m, 2H), 3.79 (s, 3H), 2.70-2.56 (m, 4H), 1.80-1.61 (m, 4H).

¹³C NMR (101 MHz, DMSO-d₆) δ 159.02, 149.49, 146.85, 146.82, 141.30, 139.97, 127.57, 119.91, 116.58, 112.26, 111.86, 55.56, 22.64, 21.99, 21.04, 20.59.

The indazole hydrazide compound represented by formula (10):

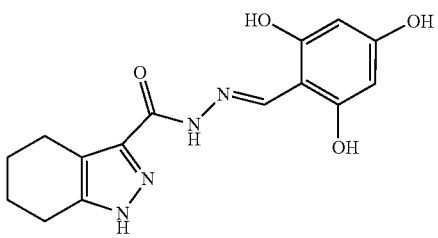 [SMILES: O=C(N/N=C/c1c(O)cc(O)cc1O)c1n[nH]c2c1CCCC2]

$^1$H NMR (400 MHz, DMSO-d$_6$) δ 12.91 (s, 1H), 11.72 (s, 1H), 11.10 (s, 2H), 9.74 (s, 1H), 8.80 (s, 1H), 5.81 (s, 2H), 2.63 (dt, J=21.7, 6.2 Hz, 4H), 1.85-1.52 (m, 4H).

$^{13}$C NMR (101 MHz, DMSO-d$_6$) δ 161.11, 159.60, 158.67, 145.98, 140.93, 139.99, 116.70, 99.36, 94.30, 56.08, 22.67, 22.02, 21.01, 20.60, 18.62.

Example 2: Anti-Tumor Activity Assay 2.1 Experimental Method
2.1.1 Recovery and Culture of Tumor Cells The frozen tumor cells (prostate cancer, ovarian cancer, etc.) were taken out from liquid nitrogen, and quickly dissolved at 37° C. The cells were added to 5 ml of the corresponding medium containing FBS and centrifuged at 300 g for 5 minutes. The precipitate was collected, resuspended with the corresponding medium and then mixed well. After that, cells were added to a 24-well cell culture dish, supplemented with the medium to a total volume of 2 mL per well at 37° C. and cultured. After the confluence reached about 90%, subculturing or counting and plating was performed.

2.1.2 Inoculation of Tumor Cells

After the cultured tumor cells were sufficient to be passaged, they were digested with trypsin and a single cell suspension was prepared. After counting, cells were adjusted to a concentration of 1.2×10$^4$ cells/ml with the corresponding medium. 90 µl of the mixed solution was added to a 96-well plate and incubated at 37° C. for 30 minutes. Then the mixture was added with the corresponding medium and incubated in a cell incubator at 37° C. overnight. The morphology and confluence of tumor cells were observed.

2.1.3 Preparation and Dilution of Compounds

After the tumor cells were cultured overnight, serial dilutions of the compounds were prepared and added to the culture system.

The stock solution of the indazole hydrazide compound (100 mM) dissolved in DMSO was fully dissolved at room temperature. If there was any insoluble matter, heating and ultrasonication were carried out for 5 minutes to observe until dissolution.

20 µl DMSO was added to wells 2-9 of a 96-well V-shaped compound dilution plate, and 30 µl stock solution was added to well 1. The compound dilution plate was placed on a shaking mixer. 10 µl liquid was transferred from well 1 to well 2, mixed well by pipetting and shaking, then 10 µl of liquid was transferred from well 2 to well 3, mixed well by pipetting and shaking, and so on . . . and finally 10 µl of liquid was transferred from well 8 to well 9, mixed well by pipetting and shaking, and 1000× gradient dilution stock solution was prepared. [Note: As DMSO easily absorbs moisture in the air, after the operation, the compound dilution plate was immediately sealed with parafilm, stored at 4° C., and discarded after 1 week. When using it again, the parafilm was removed after the temperature reached room temperature to avoid inaccurate concentration caused by moisture absorption.]

In the ultra-clean workbench, a 96-well sterile cell culture plate was used. 198 µl of medium was added to wells 1-9, and 2 µl of the stock solution in wells 1-9 of the 1000× stock solution was transferred to the corresponding wells 1-9 of the 96-well sterile cell culture plate, mixed well by pipetting and shaking, and 10× stock solution was prepared. This stock solution needed to be prepared and used on the same day.

10 µl of the 10× stock solution prepared on the day was added to the cell culture medium.

Referring to FIG. 19, FIG. 19 is a schematic diagram of the preparation and dilution of the indazole hydrazide compounds.

2.1.4 Addition of Drugs to be Tested

After the tumor cells was observed to be adhered to the wall and grow well, 10 µL of the compound at the corresponding concentration, the 10× stock solution prepared on the same day was added to the Plate map accordingly. It was incubated for 72 h at 37° C. under 5% carbon dioxide conditions.

Referring to FIG. 20, FIG. 20 is a schematic diagram of addition of the drug to be tested, where Null: blank well; DMSO: the well added with DMSO; BEZ235: 2.5 µM BEZ235; Staurosporine: 1 µM Staurosporine; Cpd #19 is the amide compound represented by formula (5).

2.1.5 Chemiluminescence Assay

Chemiluminescence method was used to measure ATP level of cells to evaluate cell viability. The specific operation was performed in accordance with the instructions. After the incubation, 50 µL of CTG solution was added. After mixing well, the lysis mixture was transferred to a microplate reader. After 5-10 minutes, the chemiluminescence data were gathered in the microplate reader. Excel software was used to analyze and process the data, and GraphPad Prism 7 software was used to calculate IC50 according to the fitted dose-effect curve generated by the chemiluminescence data.

2.1.6 Control and Quality Control

In this test, Z factor was used as a quality control indicator. Z' factor was defined by 4 parameters: the mean (µ) and standard deviation (σ) of the positive control (positive, p) and the negative control (negative, n).

The calculation formula is as follows:

$Z'$ factor=1−(3*(σp+σn)/|(µp−µn)|)

The negative control group was the untreated group with the addition of solvent (DMSO); the positive control was 2.5 µM BEZ235 or 1 µM Staurosporine.

For the functional test of general cellular level, Z' factor requires >0.3; the quality control value Z' factor in this test was set to >0.5.

2.2 Activity Data

A total of 12 culture plates were used for the 10 compounds of the present disclosure.

Culture plates 1 to 4 were used for cell 22RV1, where culture plate 1 was used for the activity assay of the compound represented by formula (5), the compound represented by formula (1) and the compound represented by formula (3), Z'(BEZ)=0.76, Z'(Staurosporine)=0.80; culture plate 2 was used for the activity assay of the compound represented by formula (2), the compound represented by formula (4) and the compound represented by formula (10), Z'(BEZ)=0.75, Z'(Staurosporine)=0.79; culture plate 3 was used for the activity assay of the compound represented by formula (7), the compound represented by formula (8) and the compound represented by formula (6), Z'(BEZ)=0.75, Z'(Staurosporine)=0.79; and culture plate 4 was used for the activity assay of the compound represented by formula (9), Z'(BEZ)=0.82, Z'(Staurosporine)=0.85.

Culture plates 5 to 8 were used for cells 22RV1-SPP1, where culture plate 5 was used for the activity assay of the compound represented by formula (5), the compound represented by formula (1) and the compound represented by formula (3), Z'(BEZ)=0.73, Z'(Staurosporine)=0.79; culture plate 6 was used for the activity assay of the compound represented by formula (2), the compound represented by formula (4) and the compound represented by formula (10), Z'(BEZ)=0.59, Z'(Staurosporine)=0.69; culture plate 7 was used for the activity assay of the compound represented by formula (7), the compound represented by formula (8) and the compound represented by formula (6), Z'(BEZ)=0.60, Z'(Staurosporine)=0.67; and culture plate 8 was used for the activity assay of the compound represented by formula (9), Z'(BEZ)=0.74, Z'(Staurosporine)=0.80.

Among them, SPP1 (Secreted phosphoprotein 1), also known as Osteopontin (OPN), is a secreted SIBLING family protein, which is expressed on tumor cells, macrophages, osteoclasts, fibroblasts, epithelial cells, etc. SPP1 realizes its function mainly through the binding to integrin receptors on the cell surface by RGD (arginine-glycine-aspartate) and non-RGD pathways. The sequence SVVYGLR is adjacent to the RGD motif, and it is a hidden integrin binding site: it is hidden in the full-length SPP1, and when the tumor progresses, SPP1 is hydrolyzed by a variety of proteases, exposing the binding site. SPP1 plays an important role in mediating adhesion and migration of tumor cells, mineralization and reconstruction of bone tissue, immune regulation, angiogenesis, fibroblast activation and reprogramming, etc. In prostate cancer and breast cancer, the high expression of SPP1 has been shown to be closely related to the poor prognosis and survival time of prostate cancer.

Culture plates 9-12 were used for cell LNCaP, where culture plate 9 was used for the activity assay of the compound represented by formula (5), the compound represented by formula (1) and the compound represented by formula (3), Z'(BEZ)=0.65, Z'(Staurosporine)=0.70; the culture plate 10 was used for the activity assay of the compound represented by formula (2), the compound represented by formula (4) and the compound represented by formula (10), Z'(BEZ)=0.74, Z'(Staurosporine)=0.78; the culture plate 11 was used for the activity assay of the compound represented by formula (7), the compound represented by formula (8) and the compound represented by formula (6), Z'(BEZ)=0.62, Z'(Staurosporine)=0.70; and culture plate 12 was used for the activity assay of the compound represented by formula (9), Z'(BEZ)=0.76, Z'(Staurosporine)=0.79.

Figure 21:
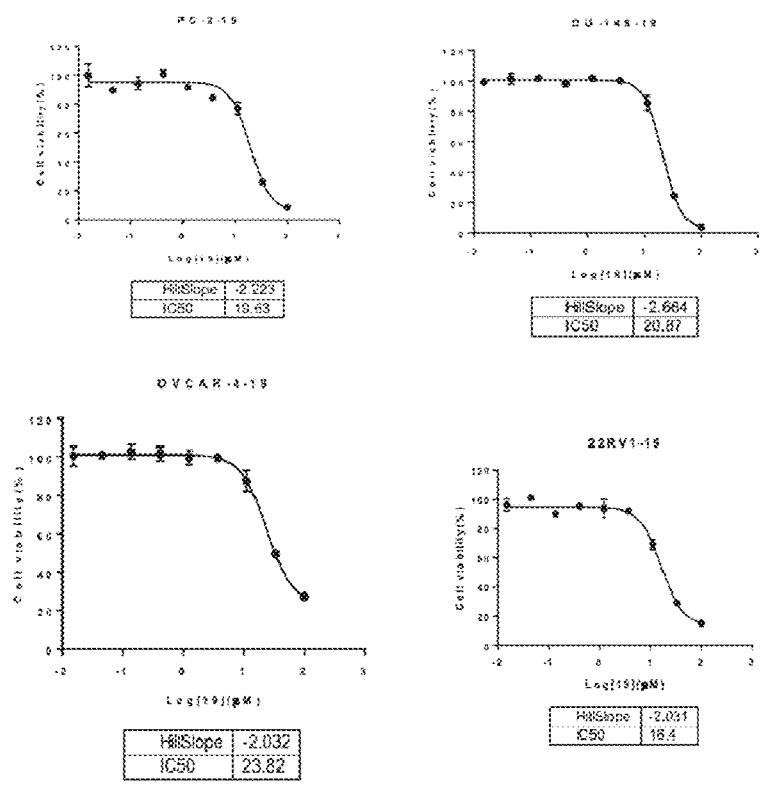
FIG. 21 shows the activity curve of the compound represented by formula (5) in Example 2 of the present disclosure on different tumor cells.
Figure 22:
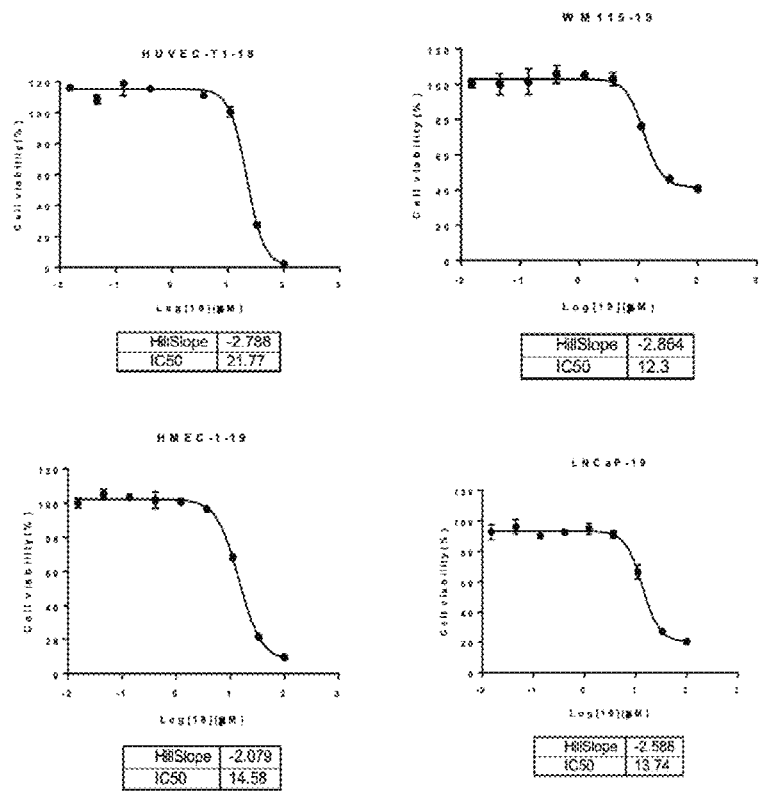
FIG. 22 shows the activity curve of the compound represented by formula (5) in Example 2 of the present disclosure on different tumor cells.

The activity curve of the compound represented by formula (5) on each tumor cell is shown in FIG. 21 to FIGS. 22, and -19 in FIG. 21 and FIG. 22 is the code of the compound represented by formula (5). It can be seen from FIG. 21 and FIG. 22 that it has obvious anti-tumor activity on prostate cancer PC-3, DU145, LNCaP, and 22RV1 cells, among which it has the highest tumor-inhibiting effect on melanoma cell WM115. It also has an inhibitory effect on ovarian cancer cell OVCAR-4. In addition, it also has an inhibitory effect on vascular endothelial cell HUVEC-T11 and microvascular endothelial cell HMEC-1.

Figure 23:
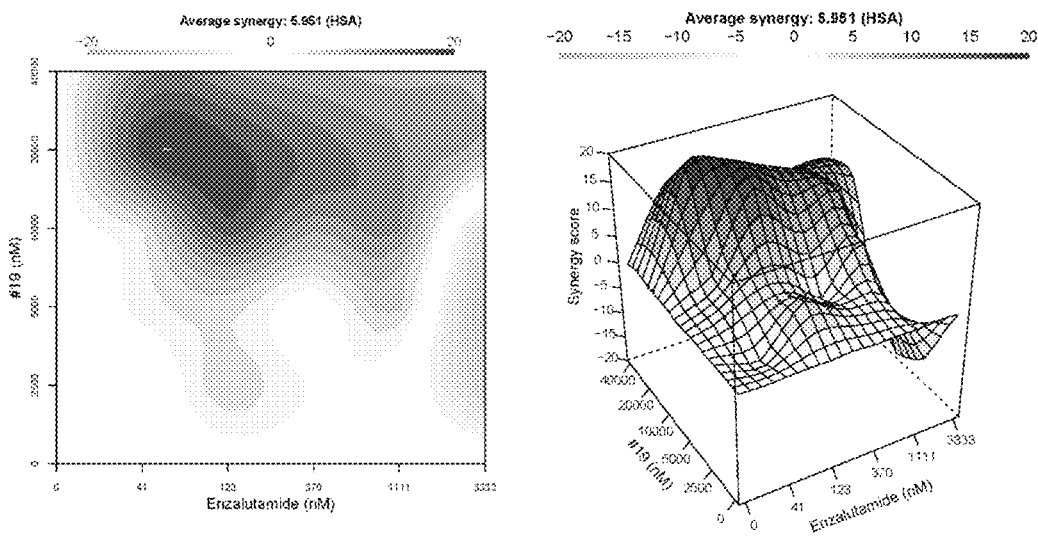
FIG. 23 shows a fitted dose-effect curve generated by the compound represented by formula (5) in combination with enzalutamide on cells 22RV1 using chemiluminescence method.

FIG. 23 shows a fitted dose-effect curve generated by the compound represented by formula (5) in combination with enzalutamide on cells 22RV1 using chemiluminescence method. It can be seen from FIG. 23 that the combination of the compound represented by formula (5) and enzalutamide has a synergistic effect on drug-resistant 22RV1 cells.

Figure 24:
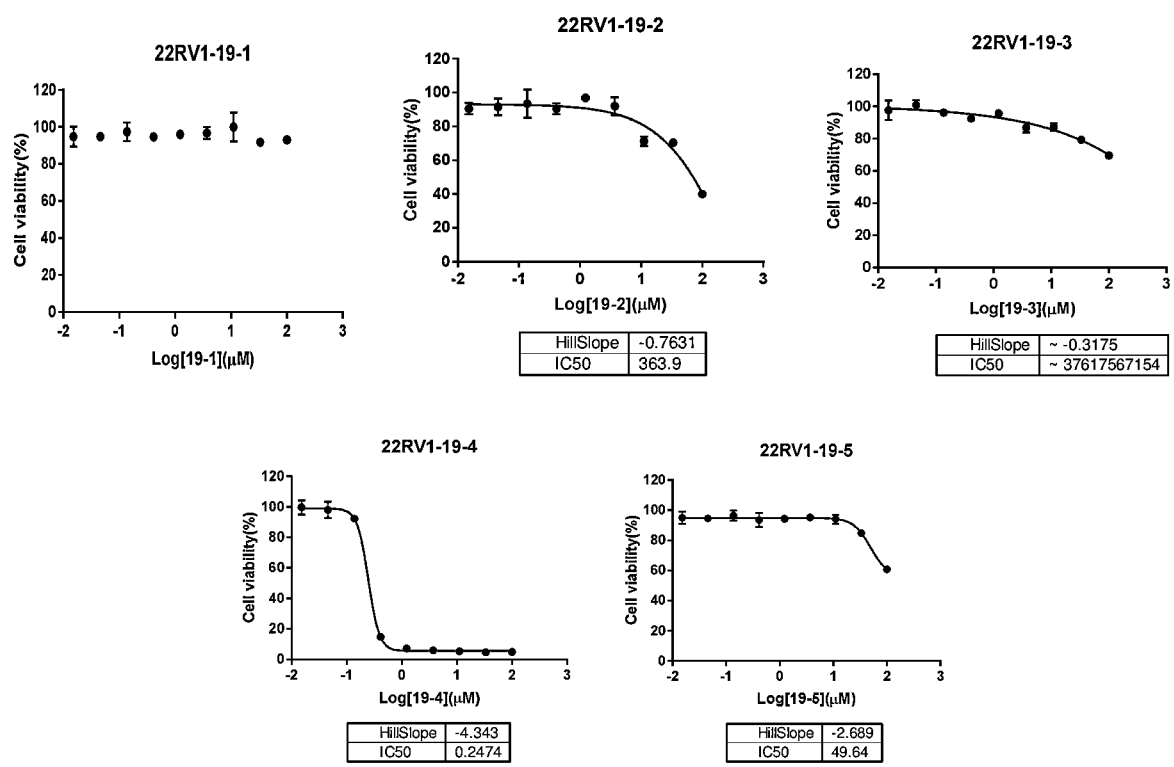
FIG. 24 shows the activity curve of the compound represented by formula (1) (code 19-1), the compound represented by formula (3) (code 19-2), the compound represented by formula (2) (code 19-3), the compound represented by formula (4) (code 19-4) and the compound represented by formula (10) (code 19-5) against tumor cells 22RV1.

FIG. 24 shows the activity curve of the compound represented by formula (1) (code 19-1), the compound represented by formula (3) (code 19-2), the compound represented by formula (2) (code 19-3), the compound represented by formula (4) (code 19-4) and the compound represented by formula (10) (code 19-5) against tumor cells 22RV1.

Figure 25:
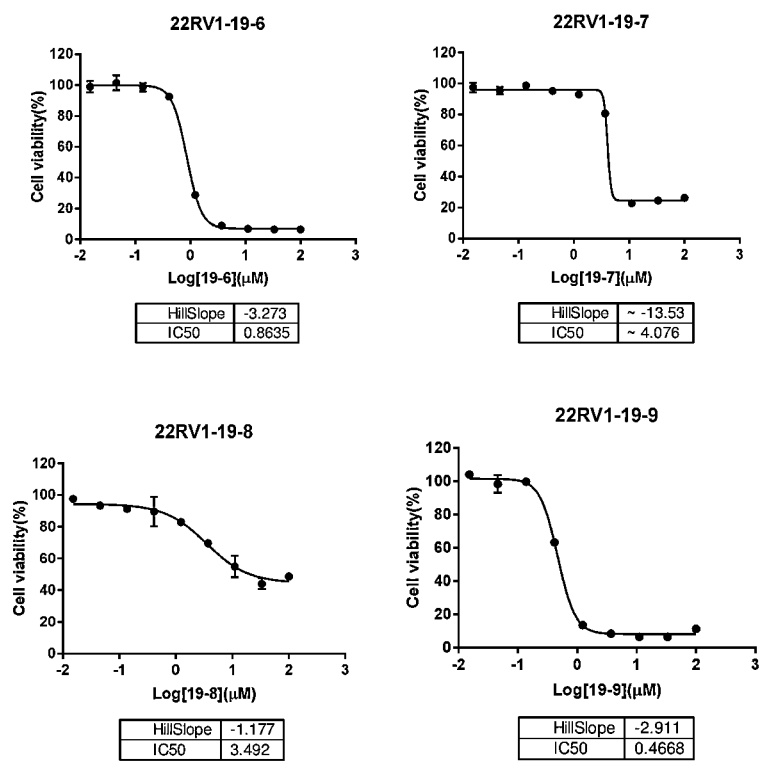
FIG. 25 shows the activity curve of the compound represented by formula (7) (code 19-6), the compound represented by formula (8) (code 19-7), the compound represented by formula (6) (code 19-8) and the compound represented by formula (9) (code 19-9) against tumor cells 22RV1.

FIG. 25 shows the activity curve of the compound represented by formula (7) (code 19-6), the compound represented by formula (8) (code 19-7), the compound represented by formula (6) (code 19-8) and the compound represented by formula (9) (code 19-9) against tumor cells 22RV1.

Figure 26:
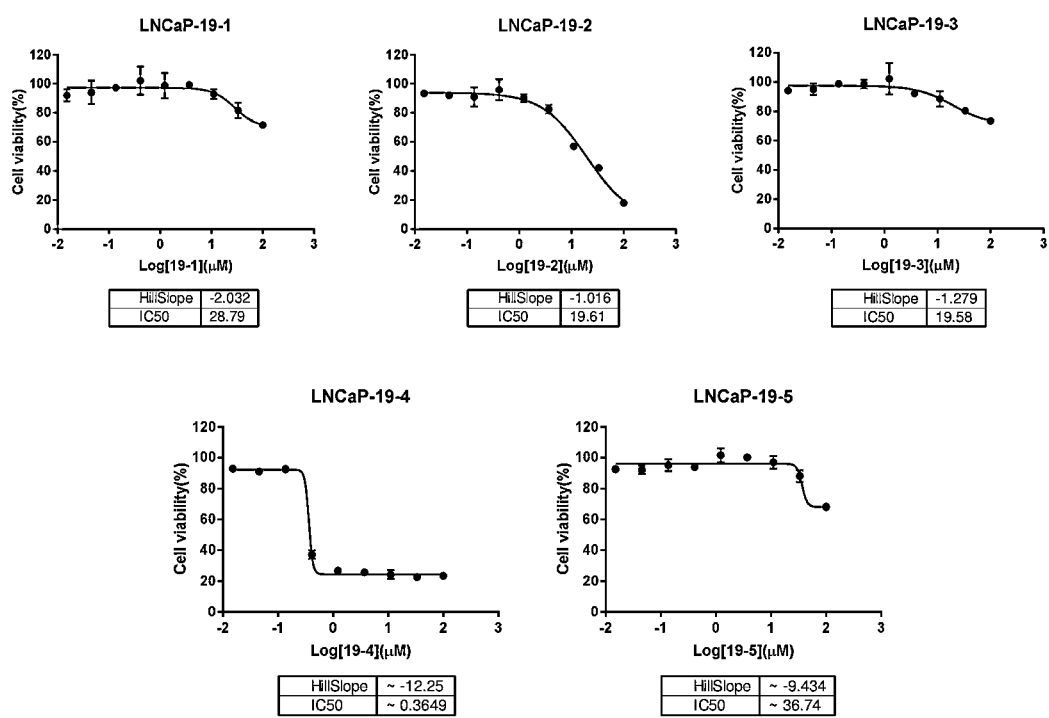
FIG. 26 shows the activity curve of the compound represented by formula (1) (code 19-1), the compound represented by formula (3) (code 19-2), the compound represented by formula (2) (code 19-3), the compound represented by formula (4) (code 19-4) and the compound represented by formula (10) (code 19-5) against tumor cells LNCaP.

FIG. 26 shows the activity curve of the compound represented by formula (1) (code 19-1), the compound represented by formula (3) (code 19-2), the compound represented by formula (2) (code 19-3), the compound represented by formula (4) (code 19-4) and the compound represented by formula (10) (code 19-5) against tumor cells LNCaP.

Figure 27:
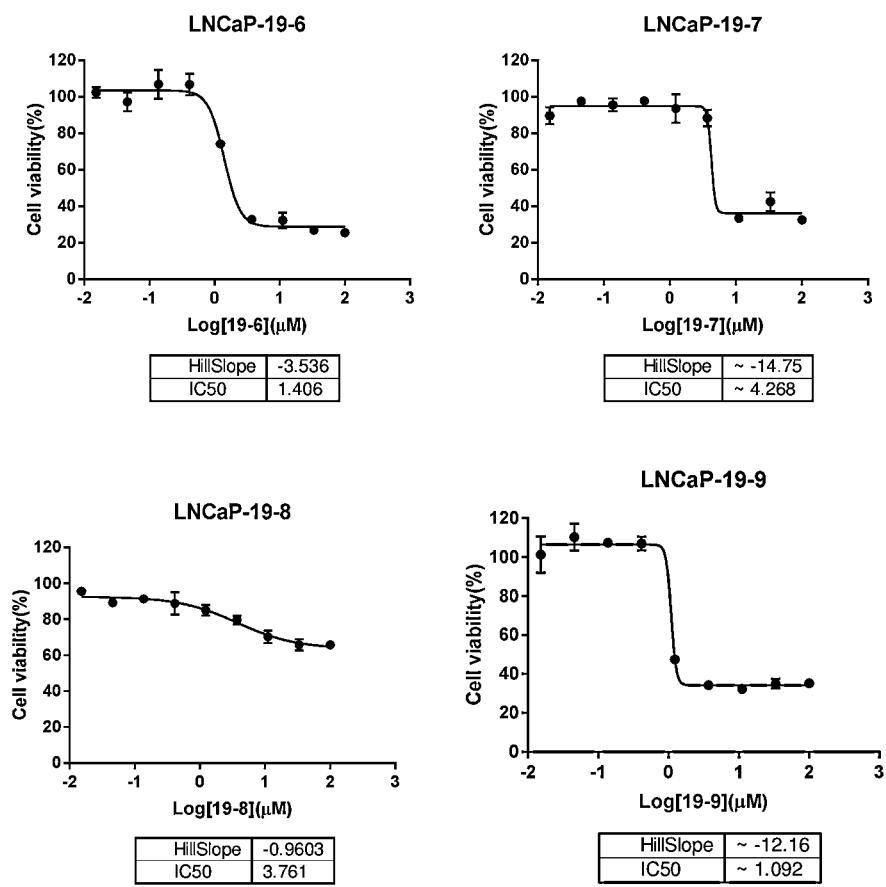
FIG. 27 shows the activity curve of the compound represented by formula (7) (code 19-6), the compound represented by formula (8) (code 19-7), the compound represented by formula (6) (code 19-8) and the compound represented by formula (9) (code 19-9) against tumor cells LNCaP.

FIG. 27 shows the activity curve of the compound represented by formula (7) (code 19-6), the compound represented by formula (8) (code 19-7), the compound represented by formula (6) (code 19-8) and the compound represented by formula (9) (code 19-9) against tumor cells LNCaP.

Table 1 shows the activity data of the indazole hydrazide compounds prepared in Example 1 against different tumor cells.

TABLE 1

| Anti-tumor activity data | | | | |
|---|---|---|---|---|
| Code | MW | STRUCTURE | IC50 (uM) | Hillslope |
| 19-1 | 325.39 | 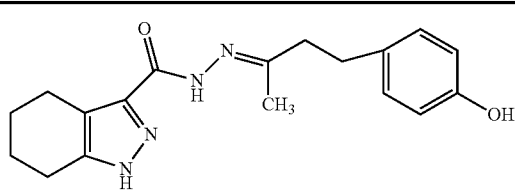 | 22RV1: NA<br>LNCaP: 28.79 | 22RV1: NA<br>LNCaP: −2.032 |

TABLE 1-continued
Anti-tumor activity data
| Code | MW | STRUCTURE | IC50 (uM) | Hillslope |
|---|---|---|---|---|
| 19-2 | 364.49 | 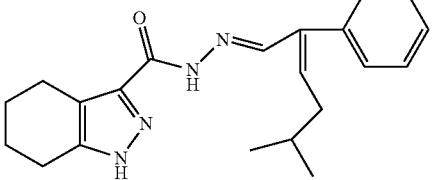 | 22RV1: 363.9<br>LNCaP: 19.61 | 22RV1: −0.7631<br>LNCaP: −1.016 |
| 19-3 | 364.37 | 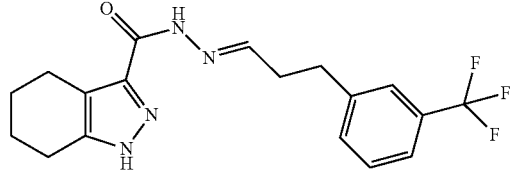 [SMILES: O=C(N/N=C/CCc1cccc(C(F)(F)F)c1)c1n[nH]c2c1CCCC2] | 22RV1: NA<br>LNCaP: 19.58 | 22RV1: NA<br>LNCaP: −1.279 |
| 19-4 | 282.35 | 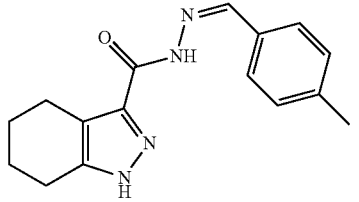 [SMILES: Cc1ccc(/C=N\NC(=O)c2n[nH]c3c2CCCC3)cc1] | 22RV1: 0.25<br>LNCaP: 0.36 | 22RV1: −4.343<br>LNCaP: −12.25 |
| 19-5 | 316.32 | 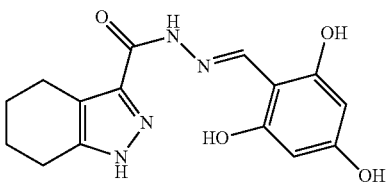 [SMILES: O=C(N/N=C/c1c(O)cc(O)cc1O)c1n[nH]c2c1CCCC2] | 22RV1: 49.64<br>LNCaP: 36.74 | 22RV1: −2.689<br>LNCaP: −9.434 |
| 19-6 | 298.35 | 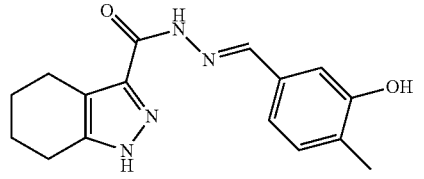 [SMILES: Cc1ccc(/C=N/NC(=O)c2n[nH]c3c2CCCC3)cc1O] | 22RV1: 0.86<br>LNCaP: 1.41 | 22RV1: −3.273<br>LNCaP: −3.536 |
| 19-7 | 328.37 | 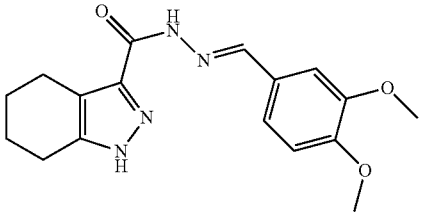 [SMILES: COc1ccc(/C=N/NC(=O)c2n[nH]c3c2CCCC3)cc1OC] | 22RV1: 4.08<br>LNCaP: 4.27 | 22RV1: −13.53<br>LNCaP: −14.75 |
| 19-8 | 313.32 | 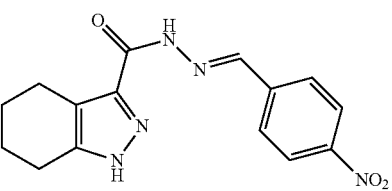 [SMILES: O=C(N/N=C/c1ccc([N+](=O)[O-])cc1)c1n[nH]c2c1CCCC2] | 22RV1: 3.49<br>LNCaP: 3.76 | 22RV1: −1.177<br>LNCaP: −0.9603 |

TABLE 1-continued

Anti-tumor activity data

| Code | MW | STRUCTURE | IC50 (uM) | Hillslope |
|---|---|---|---|---|
| 19-9 | 314.35 | 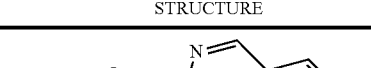 | 22RV1: 0.47<br>LNCaP: 1.09 | 22RV1: −2.911<br>LNCaP: −12.16 |

Example 3 Anti-Tumor Angiogenesis Activity Assay 3.1 Evaluation of Anti-Angiogenesis of Compounds by 2D Angiogenesis Experiment:

(1) In a 96-well plate, 50 ul of 100% Matrigel was added to each well and air bubbles should be avoided. The plate was then placed in a 37° C. incubator for 45 minutes.

(2) When the confluence of HUVEC cells in good growth state reached about 80%, the cells were digested, and resuspended in HUVEC complete medium. 40 uL of resuspension was added to each well in triplicate at a concentration of 4×10000 cells/well.

(3) 5 uL of compounds with three concentrations of high, medium and low was added to the test compound group. In the VEGF group, 5 uL of culture medium containing 200 ng/ml VEGF was added. In the solvent group, 10 uL culture medium was supplemented.

(4) Cells were incubated in a 37° C. 5% CO2 incubator for 4 h, and photos of each well were taken.

Figure 28:
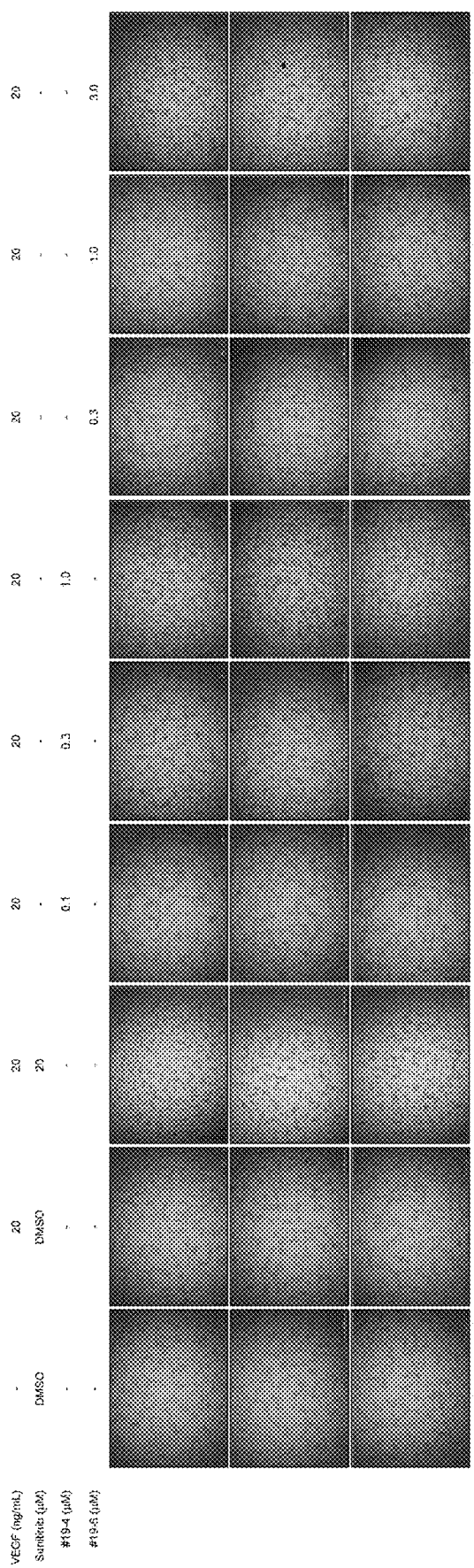
FIG. 28 is a 2D image of anti-angiogenesis evaluation.
Figure 29:
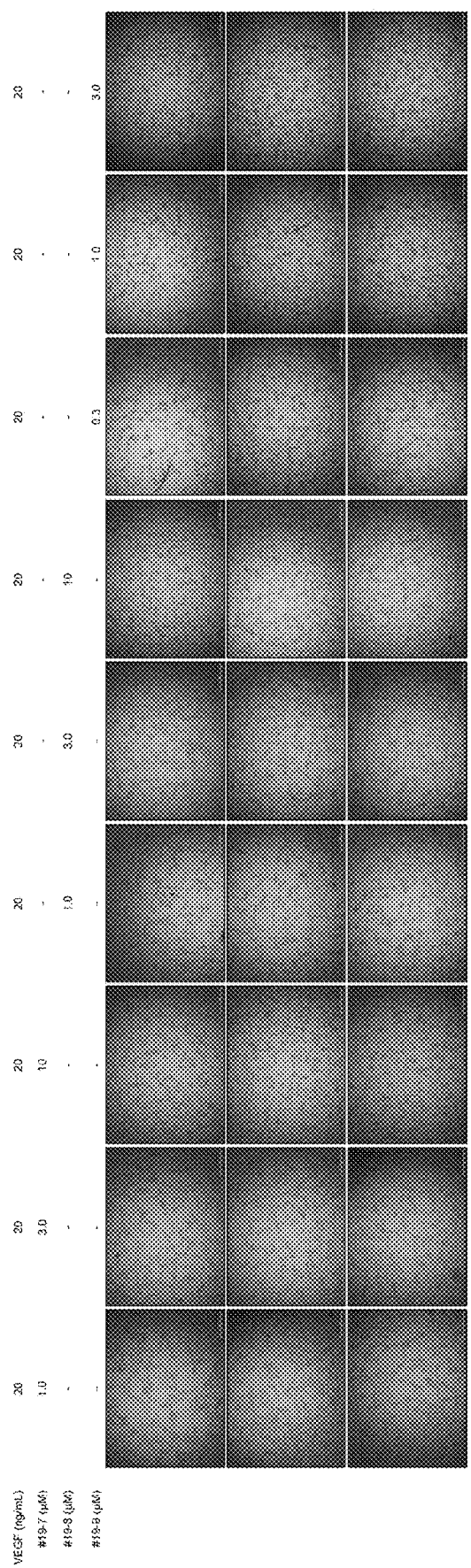
FIG. 29 is a 2D image of anti-angiogenesis evaluation.

The results are shown in FIG. 28 and FIG. 29.

The number and structure of the compound to be tested are shown in Table 2:

TABLE 2

| NO | MW | STRUCTURE |
|---|---|---|
| 19-4 | 282.35 | 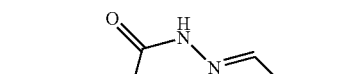 |
| 19-6 | 298.35 | |
| 19-7 | 328.37 | |
| 19-8 | 313.32 | |
| 19-9 | 314.35 | 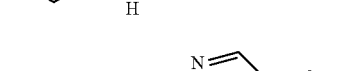 |

3.2 Experiments of Evaluating Anti-Angiogenesis of Compounds by 3D Co-Culture of Tumor Cells and HUVEC Cells:

(1) 25,000 tumor cells and 25,000 HUVEC cells were mixed and plated in a low-adsorption 24-well plate. Cells were shaken horizontally in a 37° C. incubator and placed for 24 h to form a suspension of Spheroids.

(2) 40 uL of 10% Matrigel was added to each well, and placed at 37° C. for 45 min to crosslink and harden the gel. 40 uL of suspension with Spheroids was added to wells.

(3) After 24 h, 10 uL of compounds with three concentrations of high, medium and low was added to the test compound group. In the VEGF group, 10 uL of culture medium containing 200 ng/ml VEGF was added. In the solvent group, 20 uL culture medium was supplemented.

(4) Cells were incubated in a 37° C. 5% CO2 incubator for 0, 2, 5, and 7 days, and photos of each well were taken.

Figure 30:
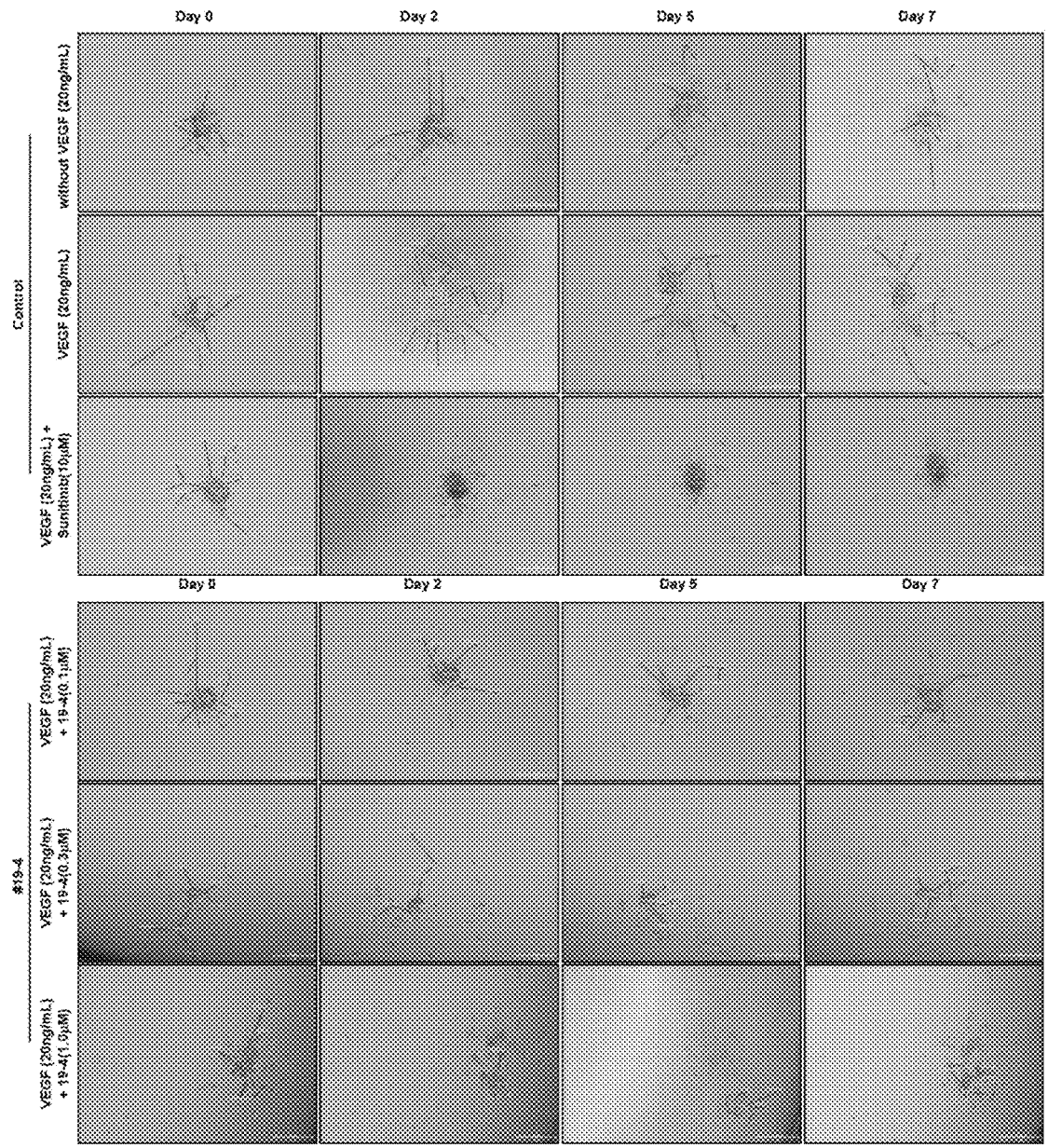
FIG. 30 is a 3D image of anti-angiogenesis evaluation.
Figure 31:
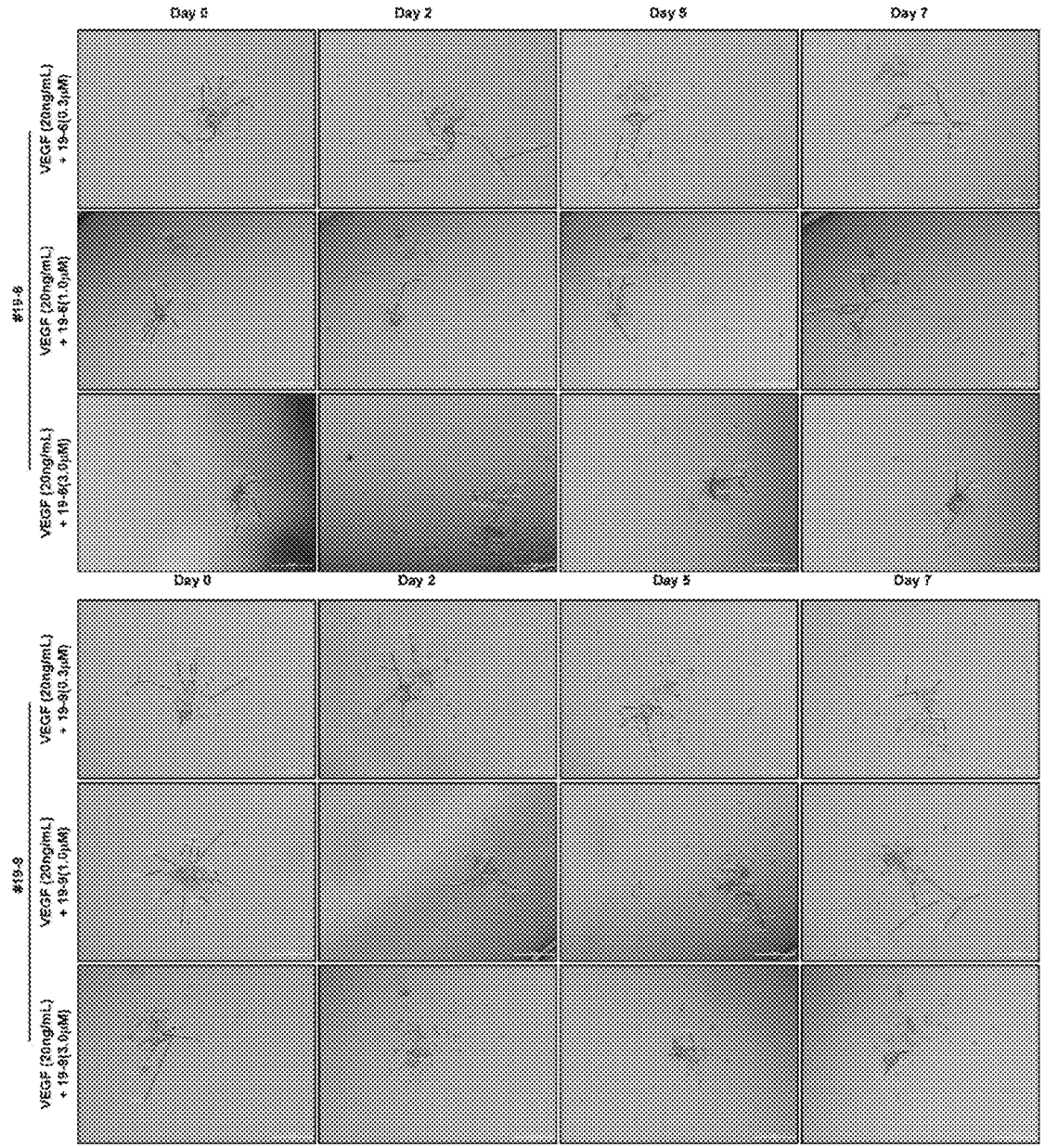
FIG. 31 is a 3D image of anti-angiogenesis evaluation.

The results are shown in FIG. 30 and FIG. 31.

3.3 Activity Data

The results of the 2D angiogenesis experiment showed that compound 19-4/6/9 showed significant inhibition of microtubule formation in the 2D angiogenesis experiment; compound 19-7/8 did not show any obvious inhibition of the microtubule formation in the 2D angiogenesis experiment.

Bright-field photos were taken under the microscope, scale bar=100 μm. The imageview software measurement tool was used to count the length of the blood vessels generated by one organoid. The average of the total length of blood vessels was calculated. It was compared with the 20 ng/ml VEGF group. *p<0.05, **p<0.01. Error bars indicate ±SEM.

Figure 32:
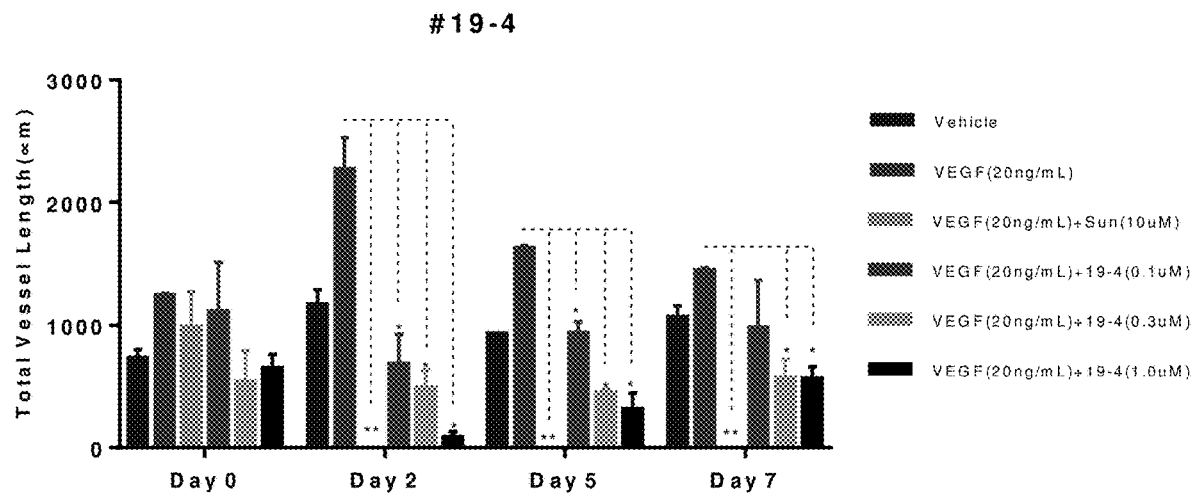
FIG. 32 is a data processing diagram of anti-angiogenesis evaluation.

In the 3D angioplasty experiment, the following conclusions can be drawn based on the bright field photos and the total length of blood vessels on 0, 2, 5, and 7 days after addition of drugs:

Compared with the VEGF group, 0.1 µM, 0.3 µM, and 1.0 µM 19-4 can significantly inhibit angiogenesis on day 2 and day 5, as shown in FIG. 32.

FIG. 32 shows a histogram of Day0, Day2, Day5, Day7, from left to right: Vehicle, VEGF (20 ng/mL), VEGF (20 ng/mL)+Sun (10 µM), VEGF (20 ng/mL)+19-4 (0.1 µM), VEGF (20 ng/mL)+19-4 (0.3 µM), and VEGF (20 ng/mL)+19-4 (1.0 µM).

Figure 33:
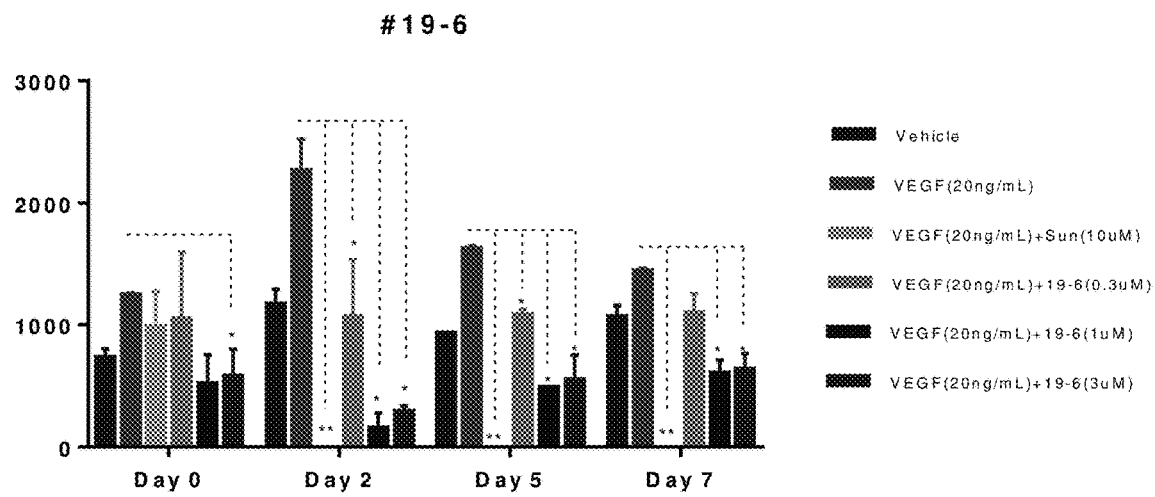
FIG. 33 is a data processing diagram of anti-angiogenesis evaluation.

Compared with the VEGF group, 0.3 µM, 1.0 µM, and 3.0 µM #19-6 can significantly inhibit angiogenesis on day 2 and day 5, as shown in FIG. 33.

FIG. 33 shows a histogram of Day0, Day2, Day5, Day7, from left to right: Vehicle, VEGF (20 ng/mL), VEGF (20 ng/mL)+Sun (10 µM), VEGF (20 ng/mL)+19-6 (0.3 µM), VEGF (20 ng/mL)+19-6 (1.0 µM), VEGF (20 ng/mL)+19-6 (3.0 µM).

Figure 34:
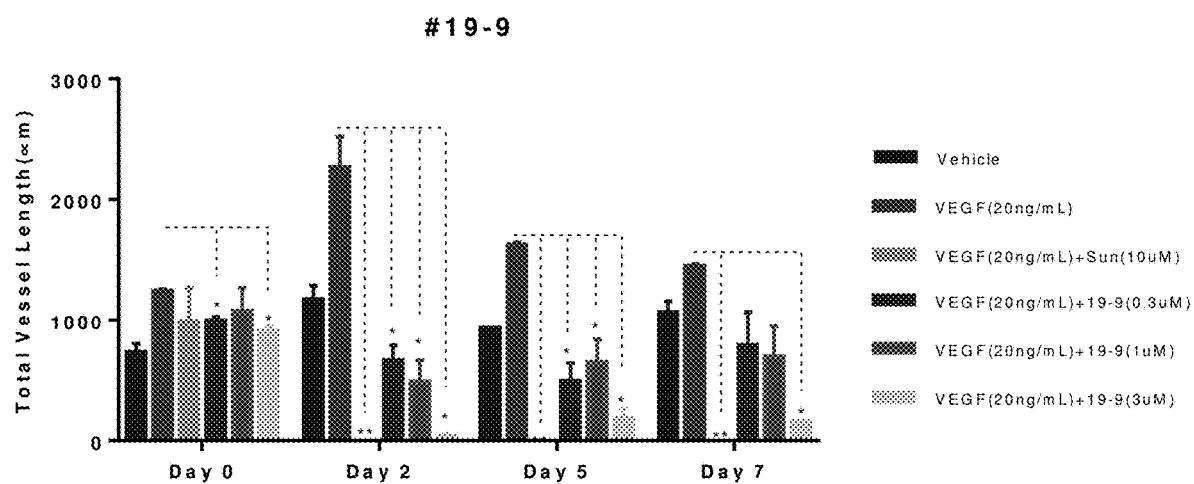
FIG. 34 is a data processing diagram of anti-angiogenesis evaluation.

Compared with the VEGF group, 0.3 µM, 1.0 µM, and 3.0 µM #19-9 can significantly inhibit angiogenesis on day 2 and day 5, as shown in FIG. 34.

FIG. 34 shows a histogram of Day0, Day2, Day5, Day7, from left to right: Vehicle, VEGF (20 ng/mL), VEGF (20 ng/mL)+Sun (10 µM), VEGF (20 ng/mL)+19-9 (0.3 µM), VEGF (20 ng/mL)+19-9 (1.0 µM), VEGF (20 ng/mL)+19-9 (3.0 µM).

Example 4 Affinity Test 4.1 Experimental Method

The surface plasmon resonance instrument Biacore 8K was used to analyze the interaction between the compound and the integrin protein αvβ3. First, the system temperature was set to 25° C., and the flow rate to 10 µL/in. PBS buffer was passed until the baseline was stable.

4.1.2 Pretreatment-Choice of Immobilizing pH

Without activating the surface of the chip, the integrin αvβ3 protein sample was dissolved in sodium acetate buffer with different pH values (pH=4, 4.5, 5) to make it carry different amounts of charge. Then the integrin protein sample flowed through the surface of the chip at a flow rate of 10 µL/min. Through the binding curve of integrin and the chip, a appropriate pH condition (pH=4.0) was determined. Finally, 50 mM NaOH eluate was injected to wash away the protein adsorbed on the chip surface.

4.1.3 Immobilization of Integrin Avβ3 Protein

CM5 chip was selected. The protein coupling was operated according to the amino coupling method, and the coupling steps are as follows:

(1) Activation: NHS/EDC mixture (0.1 M NHS and 0.4 M EDC, mixed at a volume ratio of 1:1 before use, and used immediately) was injected for 800 s at a flow rate of 10 µL/min, to activate the carboxyl of glucan on the surface of the chip;

(2) Immobilization: 20 ng/µL integrin αvβ3 protein solution was prepared with the buffer with the pH value determined in the pretreatment, and was injected for 800 s at a flow rate of 10 µL/min;

(3) Blocking: 1 M ethanolamine hydrochloride was used to block for 800 s to complete the immobilization process of the protein.

4.1.4 Binding Experiment

The compound to be tested was dissolved in PBS-P buffer (1.0×PBS, pH7.4, 0.15M Nacl, 0.05% tween-20), to prepare to a concentration of 50 µM. It was injected at a flow rate of 10 µL/min for a preliminary binding analysis.

4.1.5 Kinetic Experiment

The compound that was positive in the preliminary analysis was then prepared with buffers to a concentration gradient of 50 µM, 25 µM, 12.5 µM, 6.3 µM, 3.1 µM, 1.6 µM, 0.78 µM, 0.39 µM, 0.097 µM, 0.024 µM, and 0.0061 µM, and SB273005 was used as a positive control for a kinetic constant analysis.

The affinity results are shown in Table 3:

TABLE 3

Affinity assay results

| NO | KD affinity | STRUCTURE |
| --- | --- | --- |
| 19-5 | 2.15 µmol | |
| 19-7 | 10.1 µmol | |
| 19-9 | 780 nmol | |
| Formula (5) | 158 nmol | |

The description of the above embodiments is only used to help understand the method and core idea of the present disclosure. It should be noted that for those of ordinary skill in the art, without departing from the principle of the present disclosure, several improvements and modifications could be made to the present disclosure, and these improvements and modifications also fall within the protection scope of the claims of the present disclosure.

The invention claimed is:

1. An indazole hydrazide compound, wherein the indazole hydrazide compound is one selected from formula (1) to formula (3), formula 7, and formula 10 to formula (12):

Formula (1)
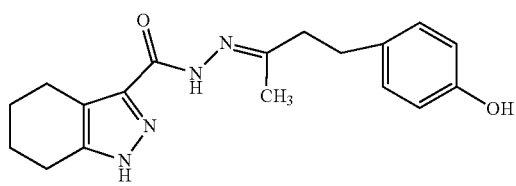
Formula (2)
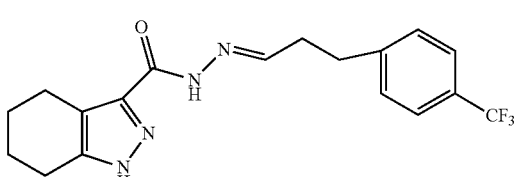
Formula (3)
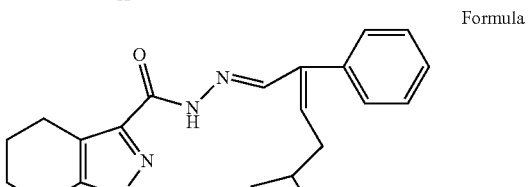
Formula (7)
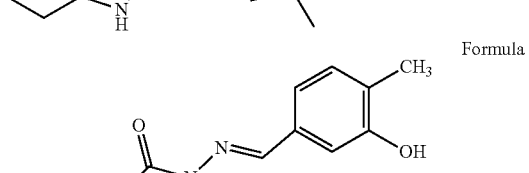
Formula (10)
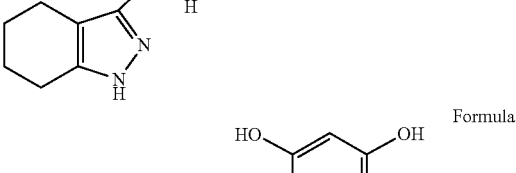
Formula (11)
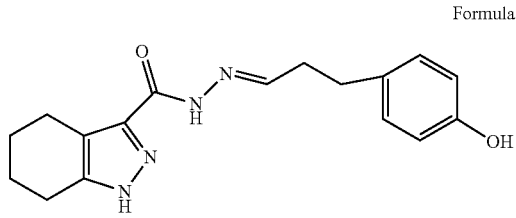
Formula (12)
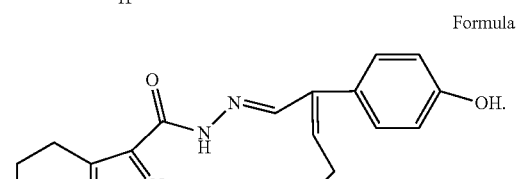
2. A method for antagonizing an integrin αvβ3 receptor, comprising using the indazole hydrazide compound, wherein the indazole hydrazide compound is one selected from formula (1) to formula (12):
Formula (1)
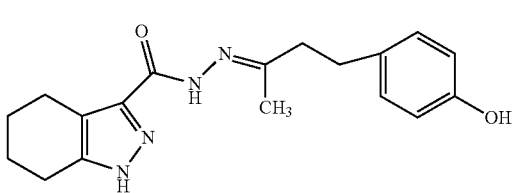
Formula (2)
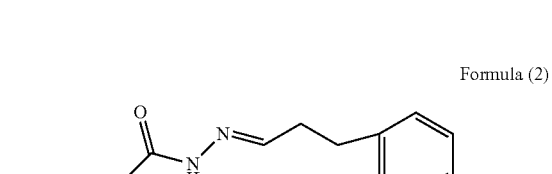
Formula (3)
Formula (4)
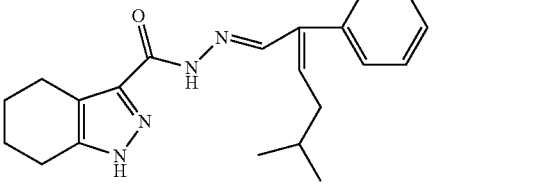
Formula (5)
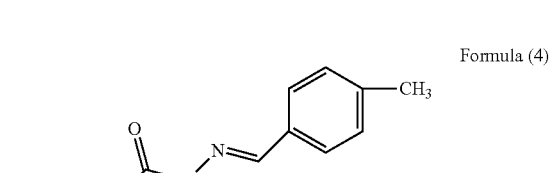
Formula (6)

-continued

Formula (7)
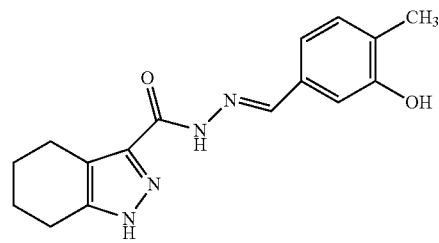

Formula (8)
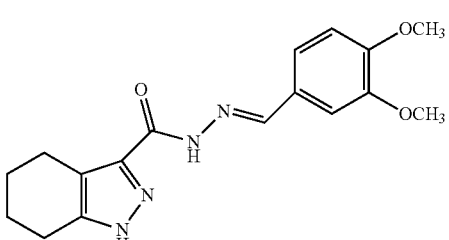

Formula (9)
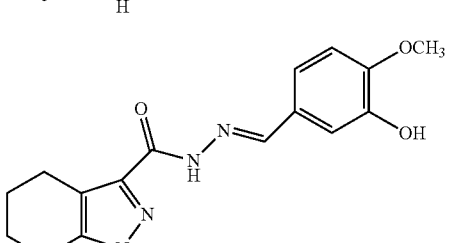

Formula (10)
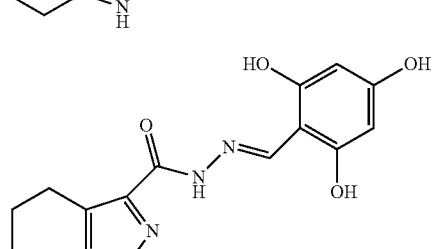

Formula (11)
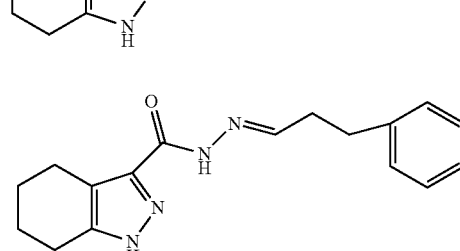

Formula (12)
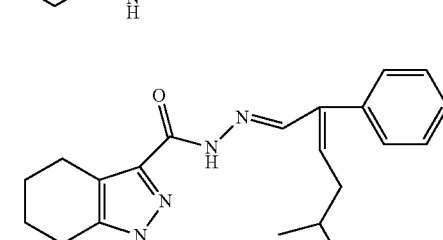

Formula (1)
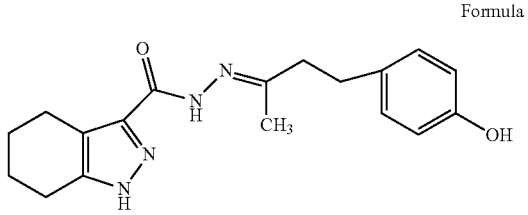

Formula (2)
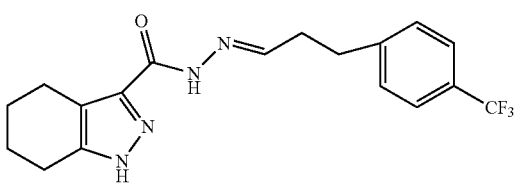

Formula (3)
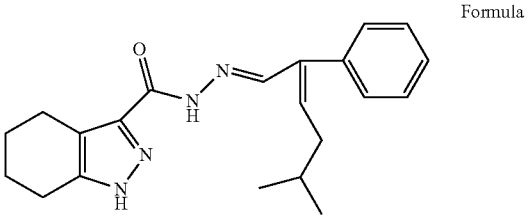

Formula (4)
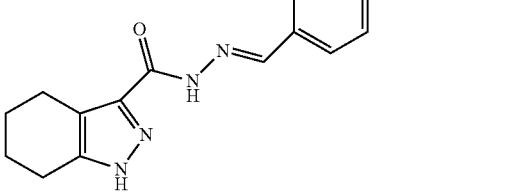

Formula (5)
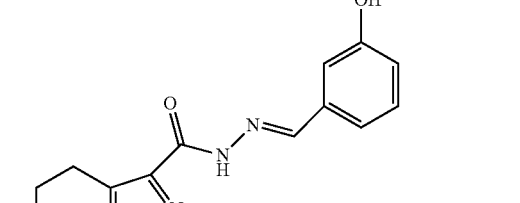

Formula (6)
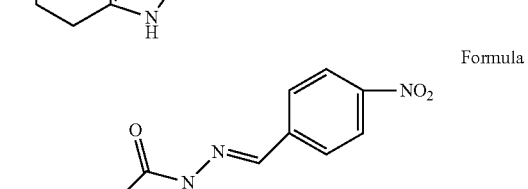

Formula (7)
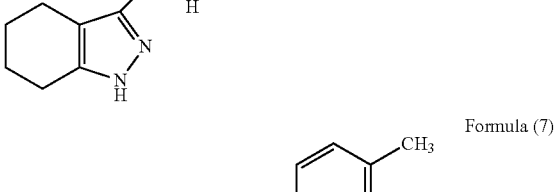

3. A method for treating a tumor, comprising administering a therapeutically effective amount of indazole hydrazide compound, wherein the tumor is one or more of prostate cancer tumor, a melanoma tumor and an ovarian cancer tumor, and the tumor is a tumor resistant to enzalutamide treatment, wherein the indazole hydrazide compound is one selected from formula (1) to formula (12):

-continued
Formula (8)
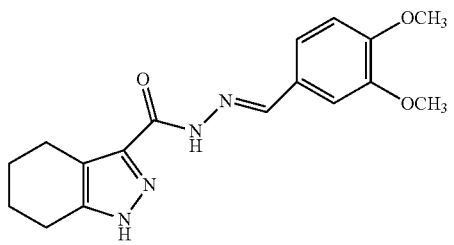
Formula (9)
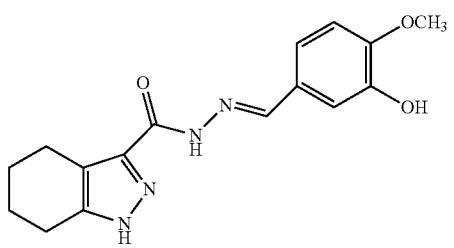
Formula (10)
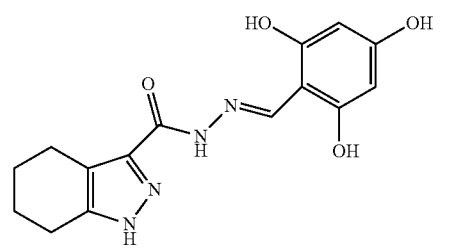
Formula (11)
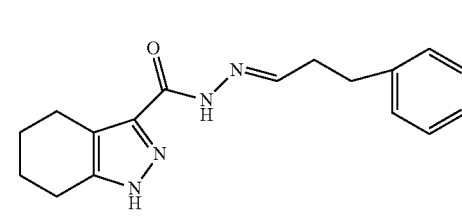
Formula (12)
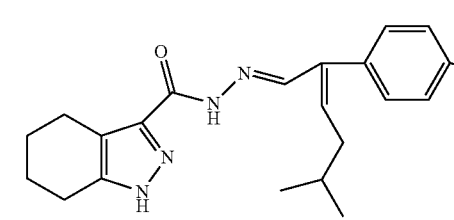
4. A method for inhibiting tumor angiogenesis, comprising administering a therapeutically effective amount of the indazole hydrazide compound to a subject in need thereof, wherein the indazole hydrazide compound has any one of the following structures:
Formula (4)
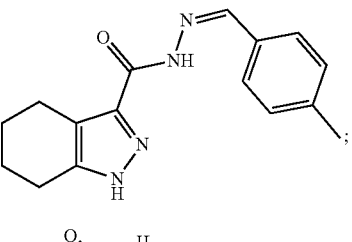
Formula (7)
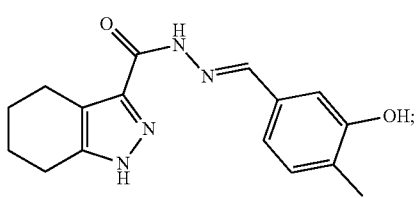
Formula (8)
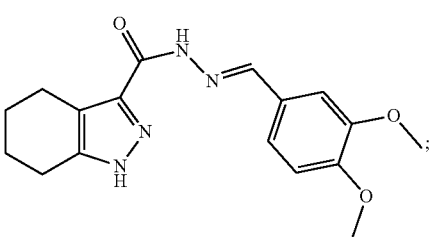
Formula (6)
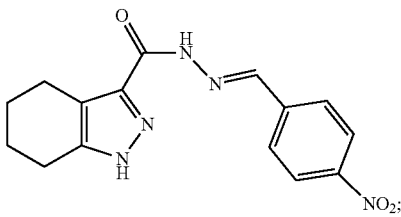
Formula (9)
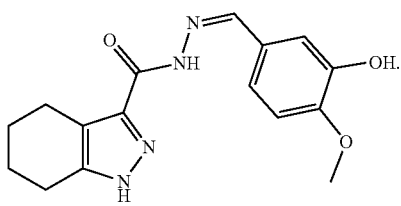
* * * * *